(12) United States Patent
Thomeer et al.

(10) Patent No.: US 7,385,523 B2
(45) Date of Patent: Jun. 10, 2008

(54) APPARATUS AND METHOD FOR DOWNHOLE WELL EQUIPMENT AND PROCESS MANAGEMENT, IDENTIFICATION, AND OPERATION

(75) Inventors: Hubertus V. Thomeer, Houston, TX (US); Sarmad Adnan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1452 days.

(21) Appl. No.: 10/013,255

(22) Filed: Nov. 5, 2001

(65) Prior Publication Data

US 2002/0050930 A1 May 2, 2002

Related U.S. Application Data

(63) Continuation-in-part of application No. 09/536,953, filed on Mar. 28, 2000, now Pat. No. 6,333,700.

(51) Int. Cl.
*G01V 3/00* (2006.01)
(52) U.S. Cl. .............. 340/854.8; 340/572.7; 340/853.1; 166/254.2; 166/255.1
(58) Field of Classification Search ............ 340/854.8, 340/825.72, 572.7, 539, 853.1; 166/254.2; 342/42; 705/65
See application file for complete search history.

(56) References Cited

U.S. PATENT DOCUMENTS

| | | | |
|---|---|---|---|
| 4,023,167 A | 5/1977 | Wahlstrom | |
| 4,572,293 A | 2/1986 | Wilson et al. | |
| 4,578,675 A | 3/1986 | MacLeod | |
| 4,630,044 A | 12/1986 | Polzer | |
| 4,656,463 A | 4/1987 | Anders et al. | |
| 4,684,946 A | 8/1987 | Issenmann | |
| 4,763,520 A | 8/1988 | Titchener et al. | |
| 4,827,395 A | 5/1989 | Anders et al. | |

(Continued)

FOREIGN PATENT DOCUMENTS

EP  0 013 494  7/1980

(Continued)

*Primary Examiner*—Albert K. Wong
(74) *Attorney, Agent, or Firm*—Rodney Warfford; David Cate; Robin Nava

(57) ABSTRACT

A method for operating a downhole tool. The method includes moving an instrument through a wellbore, and the instrument includes a first non-acoustic transponder that is adapted to detect identification codes. An identification code detected from at least one second non-acoustic transponder is compared to a reference code. The at least one second non-acoustic transponder is attached to an emplaced structure in the wellbore, and the comparison is performed when the instrument moves by the at least one second non-acoustic transponder. The downhole tool is then operated if the identification code matches the reference code.

A downhole tool operation system including at least one first non-acoustic transponder emplaced in a wellbore and adapted to communicate an identification code. At least one second non-acoustic transponder is adapted to move through the wellbore, and the at least one second non-acoustic transponder is adapted to detect an identification code when moving by the at least one first non-acoustic transponder. A processor is coupled to the at least one second non-acoustic transponder and is adapted to compare the identification code to a reference code and operate the downhole tool if the identification code matches the reference code.

33 Claims, 17 Drawing Sheets

U.S. PATENT DOCUMENTS

| | | |
|---|---|---|
| 4,968,978 A | 11/1990 | Stolarczyk |
| 4,980,682 A | 12/1990 | Klein et al. |
| 4,992,787 A | 2/1991 | Helm |
| 5,144,298 A | 9/1992 | Henneuse |
| 5,160,925 A | 11/1992 | Dailey et al. |
| 5,189,415 A | 2/1993 | Shimada et al. |
| 5,268,683 A | 12/1993 | Stolarczyk |
| 5,279,366 A | 1/1994 | Scholes |
| 5,361,838 A | 11/1994 | Kilgore |
| 5,363,094 A | 11/1994 | Staron et al. |
| 5,394,141 A | 2/1995 | Soulier |
| 5,457,447 A | 10/1995 | Ghaem et al. |
| 5,467,083 A | 11/1995 | McDonald et al. |
| 5,495,237 A | 2/1996 | Yuasa et al. |
| 5,497,140 A | 3/1996 | Tuttle |
| 5,512,889 A | 4/1996 | Fletcher |
| 5,576,703 A | 11/1996 | MacLeod et al. |
| 5,585,790 A | 12/1996 | Luling |
| 5,626,192 A | 5/1997 | Connell et al. |
| 5,680,459 A | 10/1997 | Hook et al. |
| 5,682,143 A | 10/1997 | Brady et al. |
| 5,720,345 A | 2/1998 | Price et al. |
| 5,784,004 A | 7/1998 | Esfahani et al. |
| 5,818,352 A | 10/1998 | McClure |
| 5,904,210 A | 5/1999 | Stump et al. |
| 5,945,923 A | 8/1999 | Soulier |
| 5,959,548 A | 9/1999 | Smith |
| 5,995,449 A | 11/1999 | Green et al. |
| 6,026,911 A | 2/2000 | Angle et al. |
| 6,150,954 A | 11/2000 | Smith |
| 6,333,699 B1 | 12/2001 | Zierolf |
| 6,408,943 B1 | 6/2002 | Schultz et al. |
| 6,443,228 B1 | 9/2002 | Aronstam et al. |
| 6,481,505 B2 | 11/2002 | Beck et al. |
| 6,497,280 B2 | 12/2002 | Beck et al. |
| 2002/0158120 A1 | 10/2002 | Zierolf |
| 2002/0185273 A1 | 12/2002 | Aronstam et al. |
| 2003/0090390 A1 | 5/2003 | Snider et al. |

FOREIGN PATENT DOCUMENTS

| | | |
|---|---|---|
| EP | 0273379 A2 | 12/1987 |
| EP | 0539240 A2 | 10/1992 |
| EP | 0539240 A3 | 10/1992 |
| EP | 0 412 535 B1 | 5/1994 |
| EP | 0623708 A1 | 5/1994 |
| EP | 0651132 A2 | 10/1994 |
| EP | 0651132 A3 | 10/1994 |
| EP | 0730083 A2 | 9/1996 |
| EP | 0730083 A3 | 8/1998 |
| EP | 0 972 909 A2 | 1/2000 |
| EP | 1076155 A1 | 2/2001 |
| WO | WO 00/60780 | 10/2000 |
| WO | WO 00/73625 | 12/2000 |
| WO | 01/18357 A2 | 3/2001 |
| WO | 01/73423 A1 | 10/2001 |
| WO | WO 01/92675 A2 | 12/2001 |
| WO | 02/20939 A1 | 3/2002 |
| WO | WO-02/088618 A1 | 11/2002 |

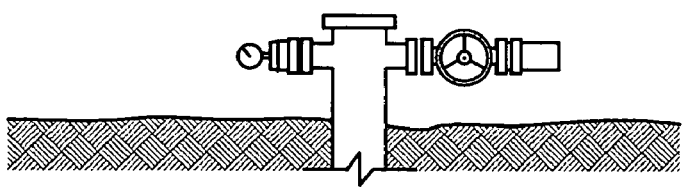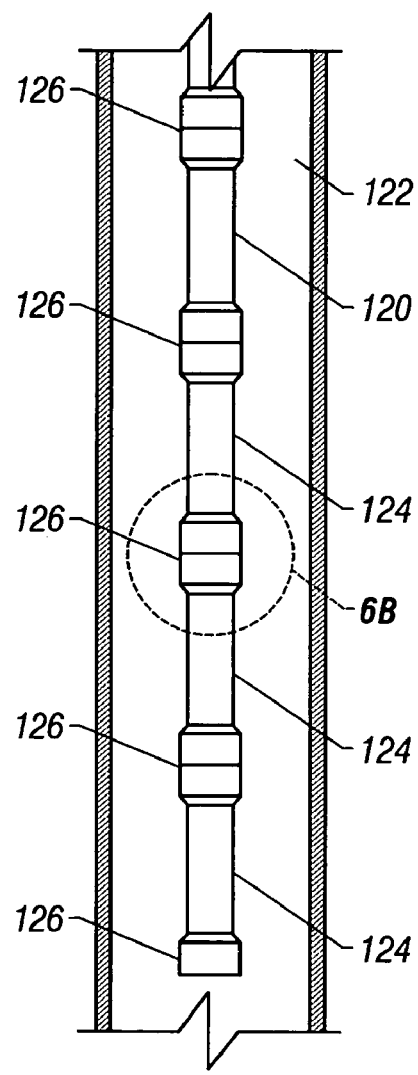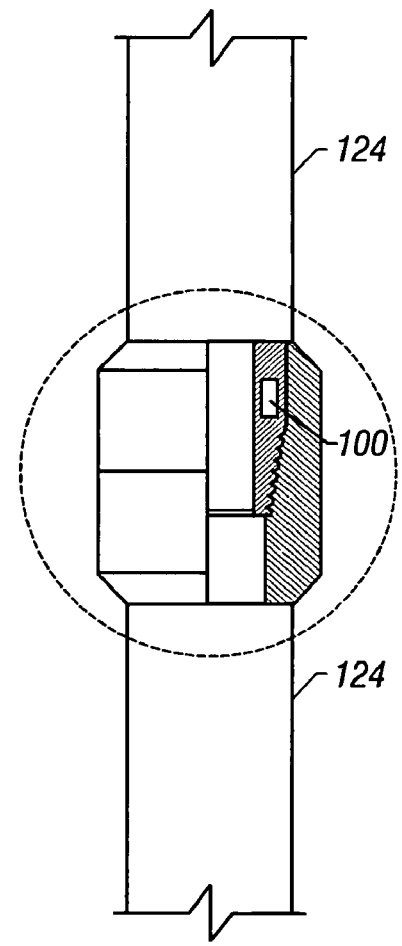
FIG. 6A　　　　　　　　FIG. 6B

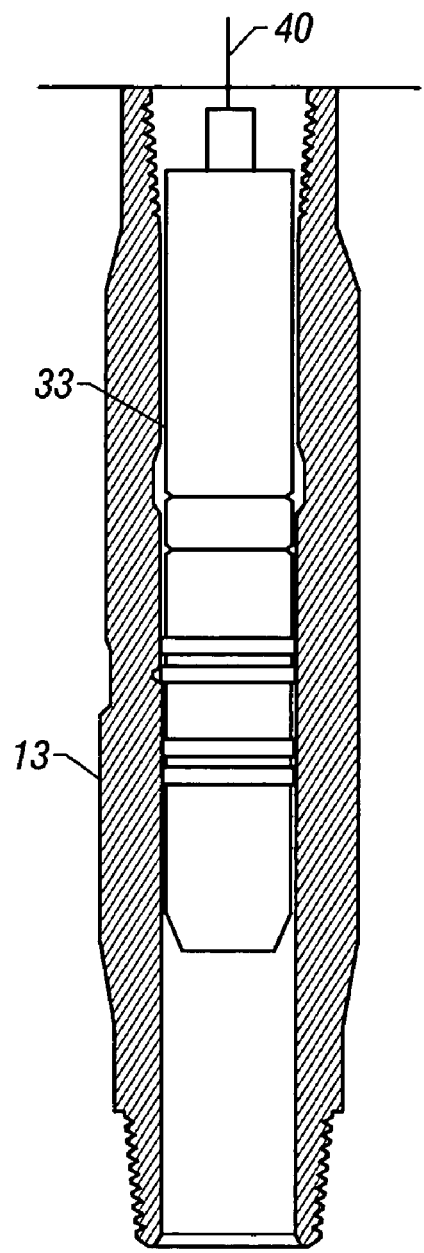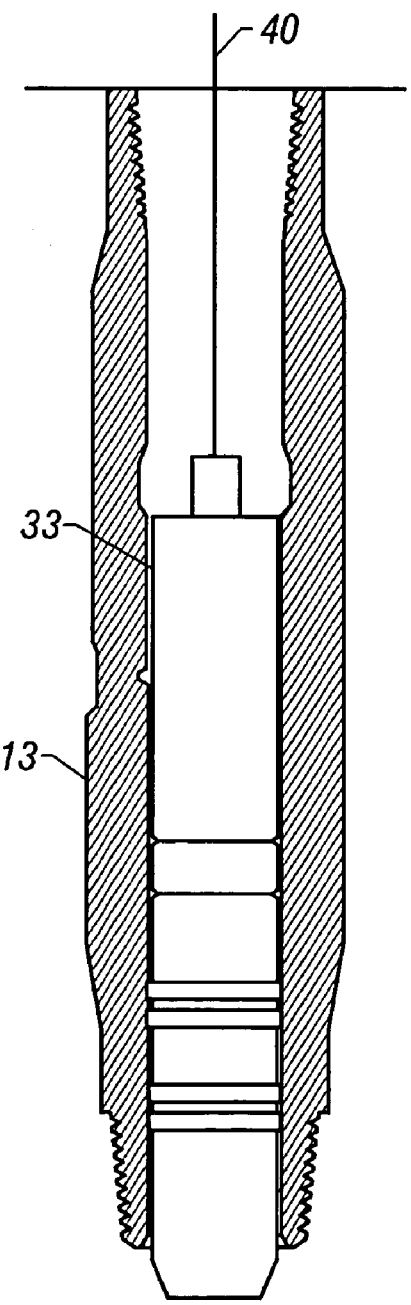
FIG. 7A     FIG. 7B

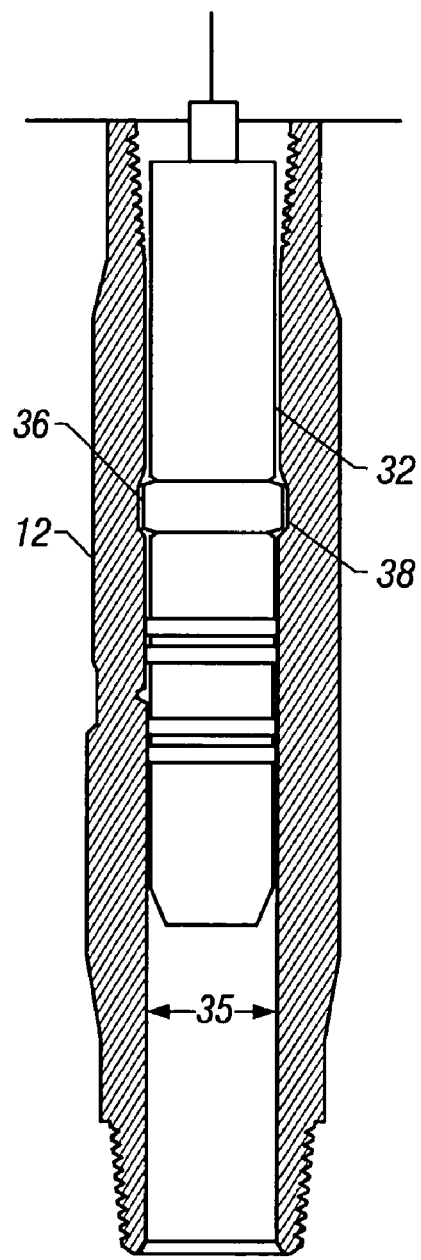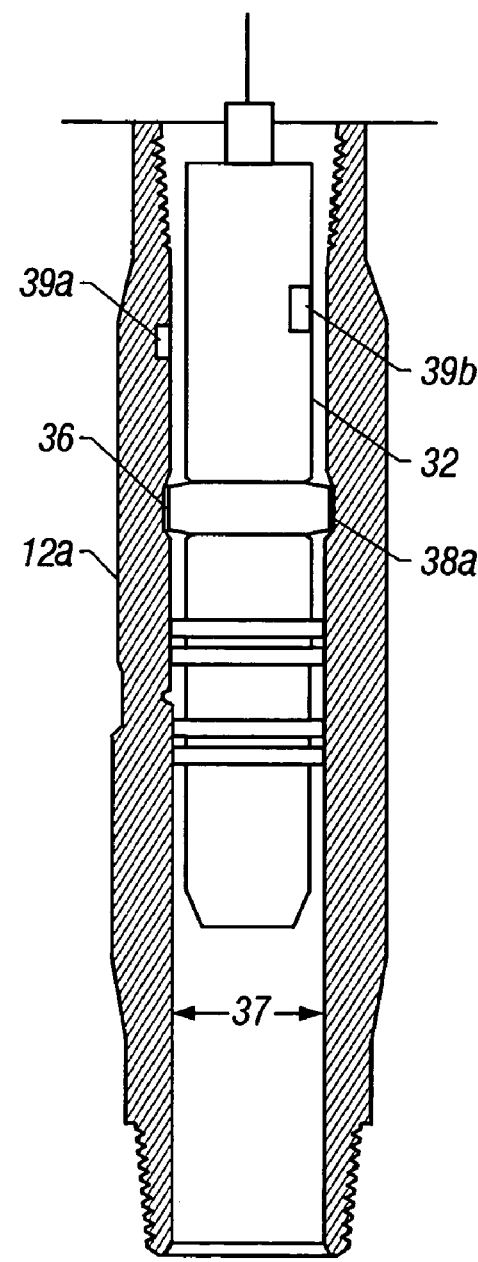
FIG. 9A      FIG. 9B

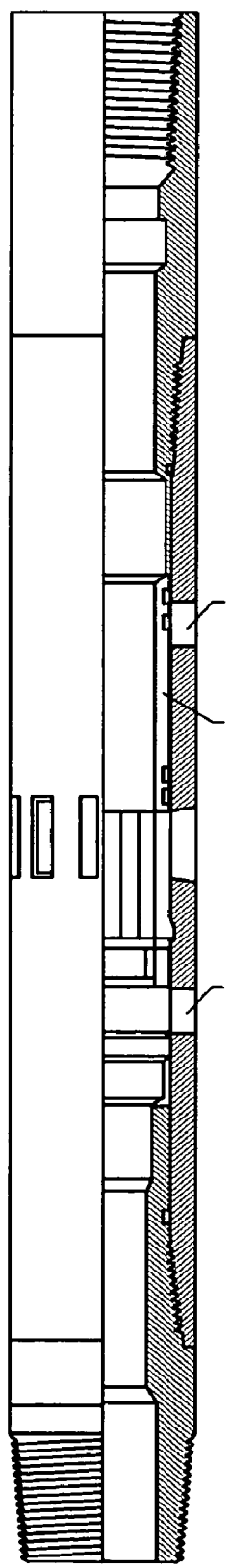
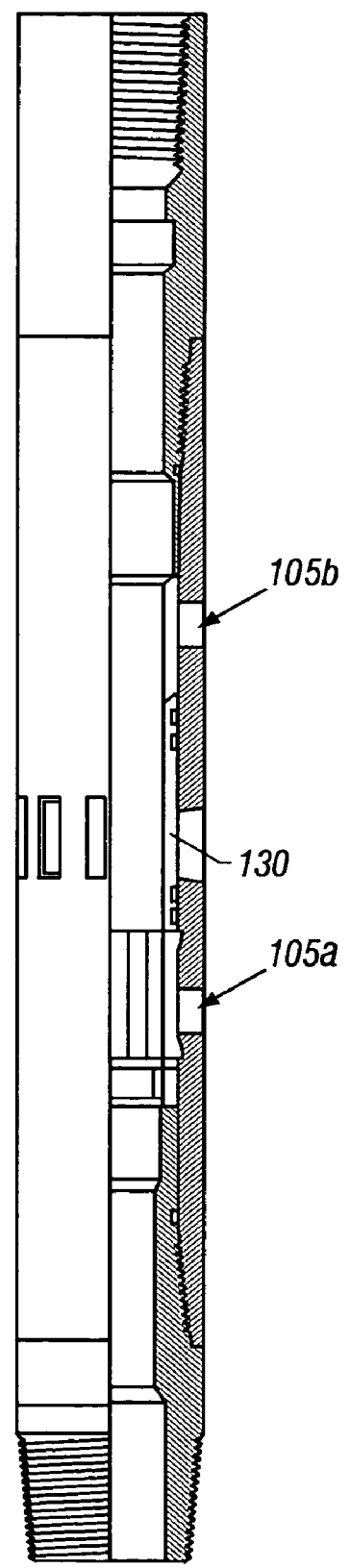
FIG. 11A  FIG. 11B

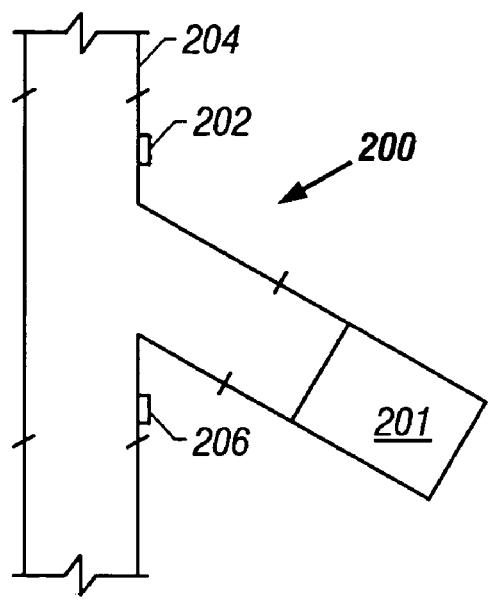
FIG. 13
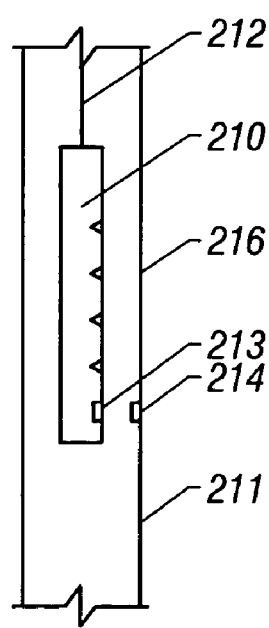 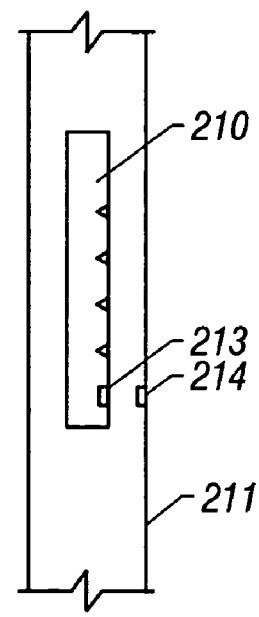
FIG. 14A  FIG. 14B

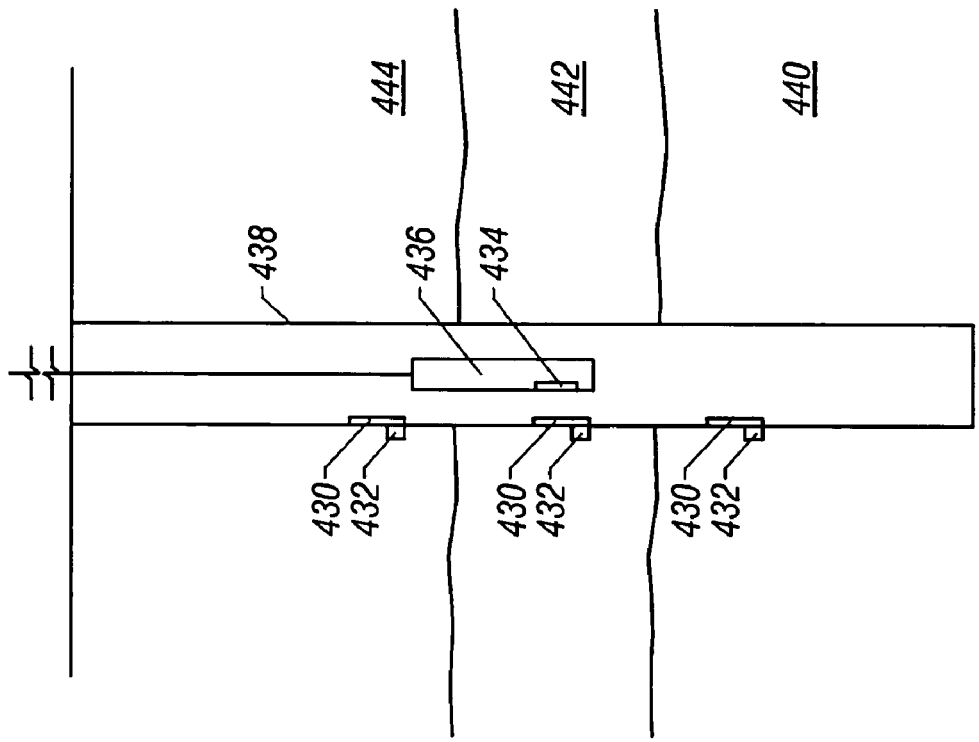
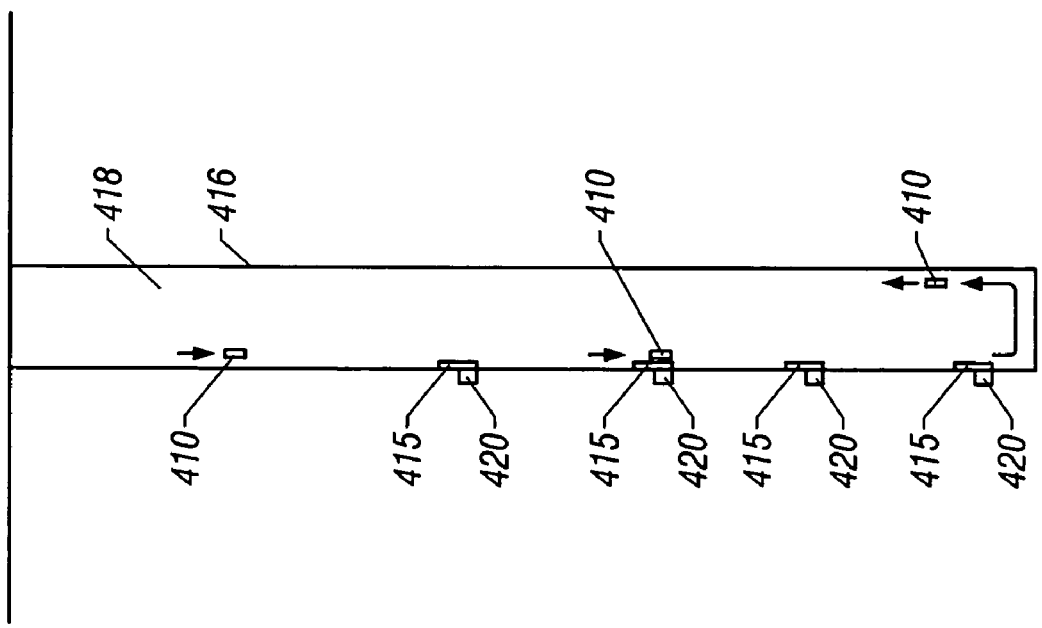

APPARATUS AND METHOD FOR DOWNHOLE WELL EQUIPMENT AND PROCESS MANAGEMENT, IDENTIFICATION, AND OPERATION

CROSS-REFERENCE TO RELATED APPLICATIONS

This application is a continuation-in-part of U.S. application Ser. No. 09/536,953, filed Mar. 28, 2000, now U.S. Pat. No. 6,333,700.

BACKGROUND OF INVENTION

1. Field of the Invention

The invention relates generally to the equipment and methods used in the drilling and completion of wells. More specifically, the invention relates to advanced systems and methods for locating, activating, and managing downhole equipment.

2. Background Art

Hydrocarbons, such as oil and natural gas, are generally extracted from subsurface reservoirs by drilling a well that penetrates a targeted hydrocarbon-bearing formation. Once a wellbore has been drilled, the well must be "completed" before hydrocarbons can be produced. A completion process involves the design, selection, and installation of tubulars, tools, and other downhole equipment that are located in the wellbore for the purpose of conveying, pumping, and/or controlling the production of fluids (e.g., hydrocarbons) from the formation.

Each phase of well construction (e.g., drilling, completion, and production) includes using a variety of equipment, including tubular members such as casing, production tubing, landing nipples, and gas lift mandrels; flow control devices such as gas lift valves, subsurface safety valves, and packers; and other downhole equipment, such as perforating guns. In many situations it is necessary to lower one piece of equipment or a tool into the wellbore so that it can be installed at a particular location (e.g., at a selected depth and/or azimuthal position) in the wellbore. For example, a gas lift valve may be positioned in a selected gas lift mandrel, and there may be several gas lift mandrels disposed at different selected depths in the wellbore. Alternatively, a different well tool may be used to perform a desired action at a desired location in the wellbore (e.g., a perforating gun may be used to perforate well casing at a particular depth proximate a targeted hydrocarbon-bearing formation in the wellbore).

When drilling and completing a well, it is generally necessary to determine when a selected piece of downhole equipment is in a desired location in the wellbore. Prior methods for making this determination include, for example, lowering a tool into the wellbore on a wireline. However, positioning downhole tools in a wellbore "blindly" (e.g., by simply lowering a tool into the wellbore on the wireline or on a drillstring until it "lands" in an associated tool previously positioned in the wellbore) may be an imprecise operation. For example, a wireline retrievable subsurface safety valve can be lowered into a wellbore on a wireline to be installed in a particular landing nipple. If, for example, multiple landing nipples are located in the wellbore, the uppermost landing nipple generally must have a large inner diameter, and subsequent landing nipples positioned at increasing depths in the wellbore must have successively smaller inner diameters so that the valve may be placed at the desired depth in the well. This requires the use of multiple sizes (e.g., multiple decreasing inner diameters) of landing nipples, as well as correspondingly sized safety valves.

The multiplicity of sizes and/or diameters increases a required inventory and decreases interchangeability of tools. Moreover, the range of diameters that may be used in a selected wellbore will be limited by the drilled diameter of the wellbore and by a final production diameter required to allow sufficient flow from a bottom of the wellbore to the surface.

There is a need, therefore, for a system of and method for precisely positioning, activating, and orienting downhole tools at selected depths in the wellbore. Moreover, there is a need for a downhole system that can transmit instructions to downhole tools and that may be used with a variety of tool and wellbore sizes.

SUMMARY OF INVENTION

In one aspect, the invention comprises a method for operating a downhole tool. The method comprises moving an instrument through a wellbore. The instrument comprises a first non-acoustic transponder coupled thereto, and the first non-acoustic transponder is adapted to detect identification codes. An identification code detected from at least one second non-acoustic transponder by the first non-acoustic transponder is compared to a reference code, and the at least one second non-acoustic transponder is attached to an emplaced structure in the wellbore. The comparing is performed when the instrument moves proximate to the at least one second non-acoustic transponder. The downhole tool is operated if the identification code matches the reference code.

In another aspect, the invention comprises a method for interrogating sensors emplaced in a wellbore. The method comprises moving a first non-acoustic transponder operatively coupled to a recording device through the wellbore, and the first non-acoustic transponder is adapted to detect data from corresponding non-acoustic transponders. Data signals and an identification code communicated by at least one second non-acoustic transponder coupled to at least one sensor emplaced in the wellbore are detected and recorded when the first non-acoustic transponder is proximate thereto. The first non-acoustic transponder is then removed from the wellbore.

In another aspect, the invention comprises a method of operating a perforating gun in a wellbore. The method comprises moving a perforating gun through a wellbore. The perforating gun comprises a first non-acoustic transponder coupled thereto, and the first non-acoustic transponder is adapted to detect an identification code. An identification code detected from at least one second non-acoustic transponder by the first transponder is compared to a reference code, and the at least one second non-acoustic transponder is attached to an emplaced structure in the wellbore. The comparing is performed when the first non-acoustic transponder is proximate the at least one second non-acoustic transponder. The perforating gun is fired if the identification code matches the reference code.

In another aspect, the invention comprises a method of orienting a downhole tool in a well. The method comprises moving the downhole tool through a wellbore. The downhole tool comprises a first non-acoustic transponder coupled thereto, and the first non-acoustic transponder is adapted to detect identification codes. An identification code detected from at least one second non-acoustic transponder by the first non-acoustic transponder is compared to a reference code, and the at least one second non-acoustic transponder is disposed in a selected lateral bore in the wellbore. The downhole tool is oriented so that the downhole tool will enter the selected lateral bore if the identification code matches the reference code.

In another aspect, the invention comprises a downhole tool operation system. The system comprises at least one first non-acoustic transponder emplaced in a wellbore and adapted to communicate an identification code. At least one second non-acoustic transponder is adapted to move through the wellbore, and the at least one second non-acoustic transponder is adapted to detect an identification code when proximate the at least one first non-acoustic transponder. A processor is operatively coupled to the at least one second non-acoustic transponder and is adapted to compare the identification code to a reference code and operate the downhole tool if the identification code matches the reference code.

In another aspect, the invention comprises a system for transmitting information in a wellbore. The system comprises at least one first non-acoustic transponder disposed in the wellbore and coupled to at least one sensor. The at least one non-acoustic transponder is adapted to communicate an identification code and data signals from the at least one sensor. A downhole tool is adapted to move through the wellbore, and the downhole tool comprises at least one second non-acoustic transponder and a plurality of releasably coupled non-acoustic transponders. The at least one second non-acoustic transponder is adapted to detect identification codes and data signals communicated by the at least one first non-acoustic transponder. A processor is operatively coupled to the downhole tool, the at least one second non-acoustic transponder, and the plurality of releasably coupled non-acoustic transponders, and the processor is adapted to compare an identification code detected from the at least one first non-acoustic transponder to a reference code and to transfer the detected identification code and data signals from the at least one first non-acoustic transponder to at least one of the plurality of releasably coupled non-acoustic transponders. The downhole tool is adapted to release the at least one of the plurality of releasably coupled non-acoustic transponders into the wellbore so that it can travel to the earth's surface.

In another aspect, the invention comprises a method for operating a downhole tool. The method comprises moving an instrument through a wellbore, and the instrument comprises a first non-acoustic transponder coupled thereto. The first non-acoustic transponder is adapted to detect identification codes. A first substantially autonomous downhole tool is disengaged from the instrument at a selected depth in the wellbore, and the substantially autonomous downhole tool comprises a second non-acoustic transponder coupled thereto. The second non-acoustic transponder is adapted to communicate identification codes and corresponding data signals. The substantially autonomous downhole tool is operated in the wellbore, and the substantially autonomous downhole tool reengages the instrument when the second non-acoustic transponder is positioned proximate the first non-acoustic transponder.

In another aspect, the invention comprises a method for operating a downhole tool. The method comprises moving an instrument through a wellbore, and the instrument comprises a first non-acoustic transponder coupled thereto. The first non-acoustic transponder is adapted to detect and record identification codes and corresponding data signals communicated by a second non-acoustic transponder coupled to a first substantially autonomous downhole tool disposed in the wellbore. The second non-acoustic transponder is adapted to detect and record identification codes and corresponding data signals communicated by each of a plurality of third non-acoustic transponders when the second non-acoustic transponder is positioned proximate thereto. Each third non-acoustic transponder is attached to an emplaced structure in the wellbore and is coupled to a least one sensor.

In another aspect, the invention comprises a downhole system. The downhole system comprises at least one first non-acoustic transponder attached to an emplaced structure in the wellbore and coupled to at least one sensor. The at least one first non-acoustic transponder is adapted to communicate an identification code and data signals from the at least one sensor. An instrument is adapted to move in the wellbore, and the instrument comprises at least one second non-acoustic transponder coupled thereto. The at least one second non-acoustic transponder is adapted to communicate an identification code. A substantially autonomous downhole tool is releasably coupled to the instrument and is adapted to be released at a selected depth in the wellbore, and the substantially autonomous downhole tool comprises at least one third non-acoustic transponder coupled thereto. The at least one third non-acoustic transponder is adapted to detect and record the identification code and corresponding data signals communicated by the at least one first non-acoustic transponder when positioned proximate thereto, and the substantially autonomous downhole tool is adapted to reengage the instrument when the at least one third non-acoustic transponder is positioned proximate the at least one second non-acoustic transponder.

In another aspect, the invention comprises a downhole system. The downhole system comprises at least one first non-acoustic transponder attached to an emplaced structure in the wellbore and coupled to at least one sensor. The at least one first non-acoustic transponder is adapted to communicate an identification code and data signals from the at least one sensor. An instrument is adapted to move in the wellbore, and the instrument comprises at least one second non-acoustic transponder coupled thereto. The at least one second non-acoustic transponder is adapted to detect and record identification codes and corresponding data signals. A first substantially autonomous downhole tool is adapted to move in the wellbore, and the first substantially autonomous downhole tool comprises at least one third non-acoustic transponder coupled thereto. The at least one third non-acoustic transponder is adapted to detect and record the identification code and corresponding data signals communicated by the at least one first non-acoustic transponder when the at least one third non-acoustic transponder is positioned proximate thereto. A second substantially autonomous downhole tool is adapted to move in the wellbore, and the second substantially autonomous downhole tool comprises at least one fourth non-acoustic transponder coupled thereto. The at least one fourth non-acoustic transponder is adapted to detect and record the identification code and corresponding data signals communicated by the at least one first non-acoustic transponder when the at least one fourth non-acoustic transponder is positioned proximate thereto. The at least one third and fourth non-acoustic transponders are adapted to communicate the detected and recorded identification codes and corresponding data signals to the at least one second non-acoustic transponder when positioned proximate thereto.

Other aspects and advantages of the invention will be apparent from the following description and the appended claims.

BRIEF DESCRIPTION OF DRAWINGS

FIGS. 6A and 6B show cross-sectional views of an embodiment of the invention.

FIGS. 7A and 7B show cross-sectional views of an embodiment of the invention.

FIGS. 9A and 9B show cross-sectional views of an embodiment of the invention.

FIG. 11A shows a cross-sectional view of an embodiment of the invention.

FIG. 11B shows a cross-sectional view of an embodiment of the invention.

FIG. 13 shows a schematic view of a transponder in an embodiment of the invention.

FIG. 14A shows a schematic view of an embodiment of the invention.

FIG. 14B shows a schematic view of an embodiment of the invention.

FIG. 21 shows a schematic view of an embodiment of the invention.

FIG. 22 shows a schematic view of an embodiment of the invention.

DETAILED DESCRIPTION

Figures 1, 2:
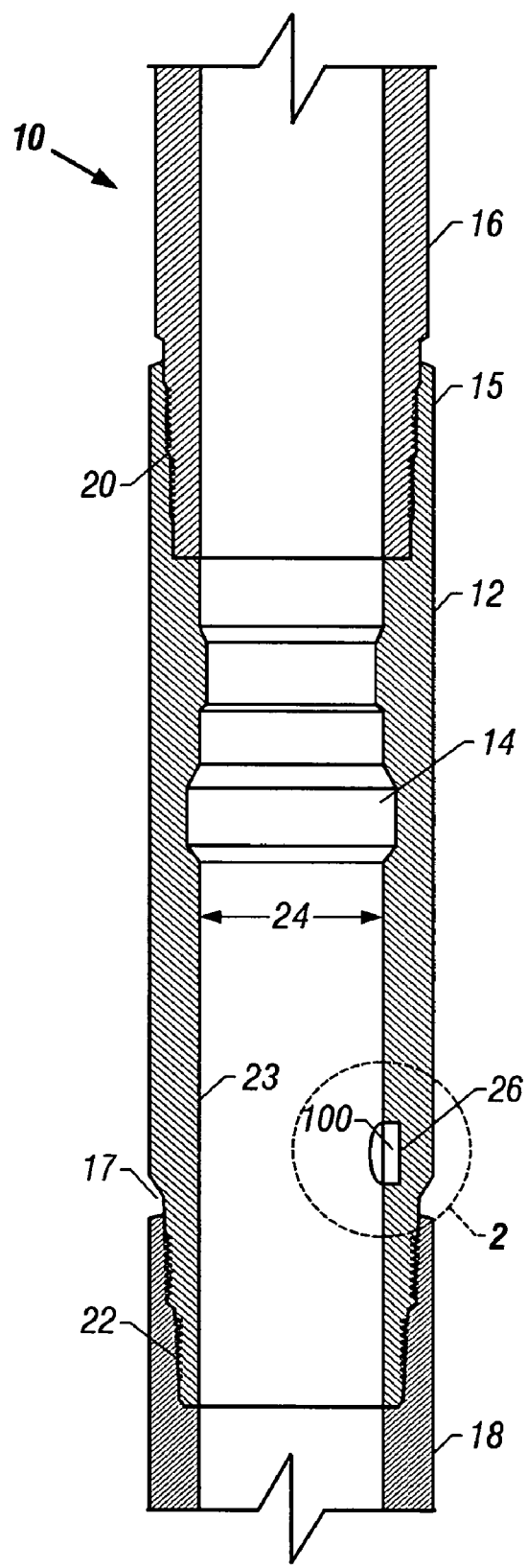
FIG. 1 shows a side cross-sectional view of an embodiment of the invention.
FIG. 2 shows a side cross-sectional view of the embodiment shown in FIG. 1.

Embodiments of the present invention comprise the use of non-acoustic transmissions, such as radio frequency transmissions, optical transmissions, tactile transmissions, magnetic transmissions, and electrical transmissions (where the transmissions may include, for example, signals, identification codes, and the like). The transmissions may be used to, for example, locate, operate, and/or manage and control downhole equipment in a wellbore. Note that the following descriptions referring to non-acoustic transponders may comprise transmitters, receivers, or a combination thereof adapted to both transmit and receive signals. Moreover, the transponders may be positioned at substantially stationary positions in the wellbore or may be movably positioned in the wellbore when attached to, for example, downhole tools. Transponders according to various embodiments of the invention are described in detail below.

Non-acoustic Transponders

In one embodiment of the invention, at least one magnetic transponder, such as a magnetic transmitter, may be attached to a downhole tool adapted to be lowered into a wellbore. At least one magnetic transponder, such as a magnetic receiver, may be disposed at a selected location (e.g., at a selected depth) in the wellbore. The magnetic transmitter may selectively transmit magnetic pulses (comprising, for example, a unique identification code) that may be received and interpreted (or decoded) by the magnetic receiver. The magnetic pulses may be generated by, for example, controlling magnetic field strength, magnetic field orientation, and/or magnetic field polarity. Note that in some embodiments, the transmitter may be positioned in the wellbore while the receiver is attached to the downhole tool.

In another embodiment of a magnetic transponder, a rotating magnet disposed in the downhole tool may activate and induce rotation of a magnet positioned in a receiver disposed in the wellbore. The receiver may comprise, for example, a circuit adapted to modulate a rotational frequency of the receiver magnet so as to generate a selected magnetic field, field strength, polarity, and the like that corresponds to a specific depth, azimuthal location, etc.

In another embodiment, at least one band or "strip" of magnetic media may be affixed to or proximate an inner surface of a wellbore (e.g., to a specially coated section of casing disposed in the wellbore). The magnetic media may comprise, for example, encoded information related to a specific depth or may be operatively coupled to downhole sensors so that downhole temperature, pressure, and the like may be "written" to the magnetic media. A downhole tool or instrument (that may be, for example, a tool adapted to read information from and/or write information to the magnetic media) may be positioned in the wellbore to read information from the magnetic media for transmission to operators at the surface or for storage in a selected memory. Note that in some embodiments the magnetic media may have to be relatively long (e.g., 1-2 meters in length) in order to contain the necessary information. The magnetic media may be oriented within the wellbore, for example, either axially or circumferentially.

In another embodiment of the invention, transmission and reception of information may be performed using an optical transponder such as, for example, a laser identification transponder. Note that different types of lasers, such as infrared lasers, may be used with this embodiment. Reflective devices, for example, may be disposed at selected depths and/or at selected azimuthal locations on an inner surface (e.g., on an inner surface of a length of casing) of a wellbore. A tool comprising a laser may be positioned in the wellbore proximate the tag so that the laser may be reflected therefrom. A unique reflected pattern may then be received by a transponder disposed on the tool, and the reflected pattern may provide information concerning the wellbore and/or wellbore conditions at a specific depth and/or azimuthal orientation. The reflected pattern may be, for example, a two dimensional pattern.

In another embodiment, transmission and reception may be performed using at least one electromechanical transponder. In one embodiment, selectively shaped rings may be positioned at selected depths in a wellbore. The rings may be positioned, for example, between lengths of casing or may be affixed to an inner diameter of a length of casing. The rings may comprise a plurality of spaced protrusions formed thereon. The protrusions may be, for example, arranged at selected azimuthal locations about an inner circumference of the ring. In this manner, the width and spacing of the protrusions, among other characteristics, may be selected to form a unique "code" indicative of a depth in the wellbore, etc. A tool may be positioned proximate the rings in the wellbore, and, for example, the width and spacing of the protrusions may be determined by an inductive or capacitive proximity transponder (e.g., an electrical signal may be transmitted and an inductance, capacitance, etc. of the target ring may be determined). Note that the rings may be formed from metal or any other suitable material known in the art.

In other embodiments, non-acoustic frequency identification transmitter units may be used with the invention. Several types of non-acoustic frequency identification transmitter units are commercially available. Suitable examples include transponders sold under the mark "Tiris," a mark of Texas Instruments, Inc., of Dallas, Tex. These radio frequency identification transmitter units are available in hermetically sealed glass capsules having dimensions of approximately 31 mm×4 mm. The units emit a radio frequency signal at about 134.2 kHz that can be read up to about 100 cm away and comprise, for example, a 64 bit memory. However, larger or smaller transmitter memories, different frequency settings, different transmitter sizes, different transmitter packaging configurations, and the like may be used in other embodiments of the invention.

Tiris transponders are adapted to store a multi-bit code, for example, a digital code of 64 bits. A first transponder embodiment is pre-programmed by the manufacturer with a pre-selected multi-bit code. A second transponder embodiment is manufactured in an un-programmed state so that an operator can program the multi-bit code. A third transponder embodiment may be programmed initially and then re-programmed a plurality of times thereafter with, for example, different multi-bit codes.

In one embodiment, the transponder is permanently programmed (either by the manufacturer or by the end user) with a selected multi-bit code. In other embodiments, after the transponder is placed downhole, the multi-bit code may be updated to reflect certain information. For example, a transponder associated with a downhole valve may update the multi-bit code each time the valve is activated. In other embodiments, the multi-bit code may be updated to reflect an open or closed position of the valve.

A Tiris radio frequency reader and antenna, also available from Texas Instruments, may be used to read the multi-bit code stored in a Tiris transponder. The reader/antenna is typically powered by battery, although it may be powered by a permanent power source through, for example, a hardwire connection (e.g., between a downhole tool and the surface). The reader/antenna generates a radio signal of a certain frequency, the frequency being tuned to match a coil in the transponder. The radio signal is transmitted from the reader/antenna to the transponder, and power stored in the coil is used to generate and transmit a signal from the transponder to the reader/antenna. The signal is generally representative of the multi-bit code stored in the transponder, and the reader/antenna receives the signal from the transponder and processes it for digital decoding. The signal, or its decoded counterpart, may then be transmitted from the reader antenna to any selected data processing equipment (e.g., to equipment located at the surface).

Applications Comprising Non-acoustic Transponders

In general, embodiments of the invention comprise at least one first non-acoustic transponder emplaced in a wellbore (e.g., either affixed to a formation or coupled to an emplaced downhole tool). At least one second non-acoustic transponder (which may, for example, be coupled to a downhole tool or other instrument) is then lowered into the wellbore proximate the at least one first non-acoustic transponder. Information in the form of a signal or a unique identification code associated with the transponders may then be transmitted/received by the first and second non-acoustic transponders and compared to a "reference" code so that, for example, a downhole tool may be operated, a condition of an emplaced downhole tool may be determined, data from sensors coupled to the at least one first non-acoustic transponder may be transferred to the at least one second non-acoustic transponder, and the like. Specific examples of embodiments comprising different aspects of the invention will be discussed in detail below.

FIGS. 1 and 2 show an embodiment comprising at least one aspect of the present invention. A segment of a tubing string 10 includes a first downhole tool, which may comprise a substantially stationary (with respect to the wellbore) first downhole tool such as a landing nipple 12 that has a hollow axial bore 14 therethrough. The landing nipple 12 is attached at its upper end 15 to an upper tubular member 16 and at its lower end 17 to a lower tubular member 18 by threaded connections 20 and 22, respectively. The landing nipple 12 has an inner diameter 24 that is defined by an inner surface of the nipple wall 23. A recess 26 is formed in the inner surface of the nipple wall 23, and a first non-acoustic transponder 100 is disposed therein. The first non-acoustic transponder 100, for example, stores a unique identification code and transmits a non-acoustic signal corresponding to the identification code. The landing nipple 12 may be formed from any material suitable for downhole use, such as steel, nickel-based alloys, and the like. A retainer cap 30, which may comprise, for example, a ceramic or composite material (such as resin coated fibers and the like), may be positioned so as to substantially cover the first non-acoustic transponder 100 and, in some embodiments, physically seal the first non-acoustic transponder 100 from contact with well fluids and other downhole tools (not shown) that may be passed through the inner diameter 24. However, because the first non-acoustic transponder 100 is generally packaged in a manner that protects the first non-acoustic transponder 100 from harmful environments, the cap 30 is not an essential aspect of the present invention.

Figure 3:
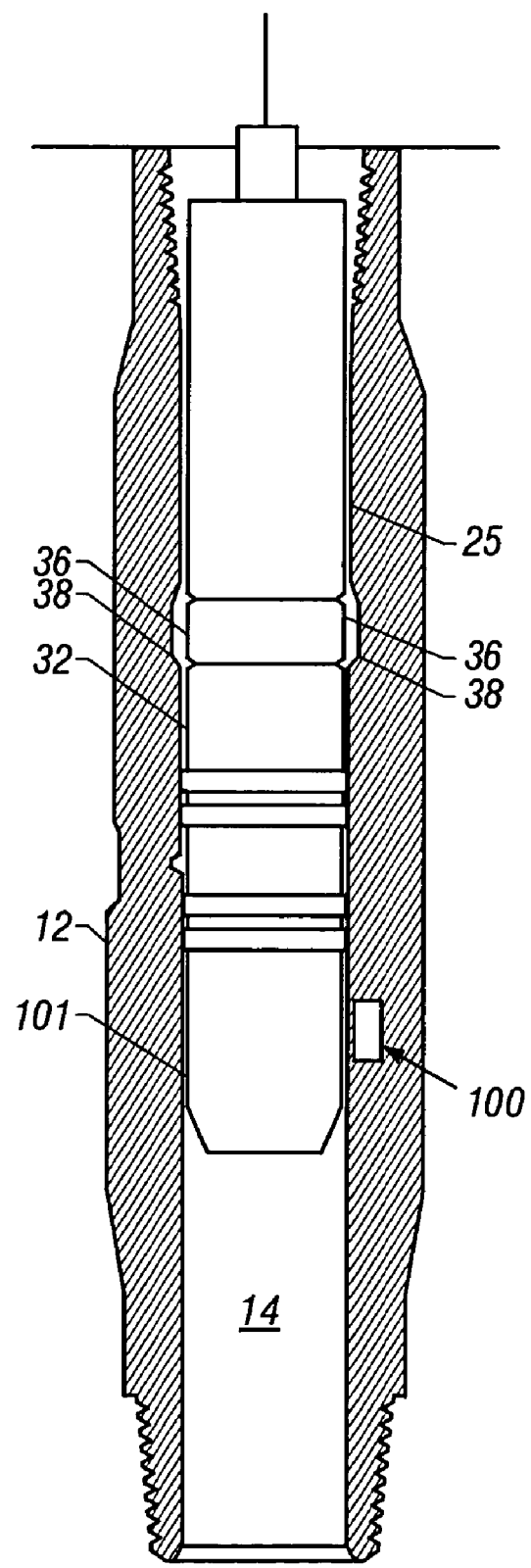
FIG. 3 shows a cross-sectional view of an embodiment of the invention.

FIG. 3 shows a second downhole tool, which in this embodiment comprises a wireline lock 32, that is adapted to operate with the landing nipple 12. The wireline lock 32 comprises a second non-acoustic transponder 101 that receives signals from, for example, the first non-acoustic transponder 100 disposed on the landing nipple 12. The second non-acoustic transponder 101 decodes the signal to determine the identification code corresponding to the first non-acoustic transponder 100, and compares the identification code to a preselected reference code.

As shown in FIG. 3, when the wireline lock 32 is disposed proximate the landing nipple 12 in the wellbore (not shown), the second non-acoustic transponder 101 may detect a signal communicated by the first non-acoustic transponder 100, decode the signal to determine the identification code, and compare the determined identification code to a reference code. Note that, according to other embodiments of the invention, the second non-acoustic transponder 101 may communicate a signal that is detected by the first non-acoustic transponder 100. If the determined identification code matches the reference code, the wireline lock 32 is operated and/or installed proximate the landing nipple 12 (or vice versa, as applicable). In this embodiment, locking tabs 36 disposed on the wireline lock 32 are extended radially outwardly into corresponding locking recesses 38 formed on an inner surface 25 of the landing nipple 12.

FIG. 3 shows the downhole tool (e.g., the wireline lock 32) positioned at a selected location in a wellbore (not shown) by, for example, the locking tab 36 connection to the locking recesses 38 formed in a tubing string (e.g., in the landing nipple 12). In this embodiment, the wireline lock 32 (which may also comprise a flow control device, a depth locating device, and/or a similar device) is axially movable along a vertical axis of the wellbore (not shown). However, it is also within the scope of the invention, for example, to axially displace the first downhole tool (e.g., the landing nipple 12 with the non-acoustic transponder 100 attached thereto) in the wellbore while maintaining the second downhole tool (e.g., the wireline lock 32 with the non-acoustic transponder 101 attached thereto) at a selected axial position in the wellbore (not shown).

Moreover, a first downhole tool (e.g., a downhole tool that is substantially emplaced in the wellbore) may be operated when a transponder coupled to the emplaced tool detects a signal communicated by a movable tool. For example, a landing nipple comprising a first non-acoustic transponder and a radial locking mechanism may be emplaced in the wellbore. A downhole tool comprising a second non-acoustic transponder may be lowered into the wellbore. When the second non-acoustic transponder is proximate the first non-acoustic transponder, the first non-acoustic transponder may detect an identification code communicated by the second non-acoustic transponder. If the detected identification code matches a reference code, the landing nipple may be operated so that the radial locking mechanism engages the downhole tool and locks the downhole tool in position in the wellbore. Alternatively, the identification code may be communicated by the first non-acoustic transponder and detected by the second non-acoustic transponder.

As described above, in some embodiments of the invention, transponders disposed on the first downhole tools that are emplaced in the wellbore may communicate signals to transponders disposed on second axially movable downhole tools. However, the system may be reversed so that the second downhole tool is adapted to detect a signal communicated by the first downhole tool and/or both transponders on the first and second downhole tools may both communicate and detect signals. Accordingly, the exemplary embodiments described herein are not intended to be limiting with respect to, for example, a direction of signal transmission and a specific type of transponder.

In some embodiments of the invention, the first transponder is secured to a tubular member having an axial bore therethrough. The first transponder may be secured to the tubular member, for example, in a recess formed in a wall of the tubular member, as shown in FIG. 1. The first transponder is preferably disposed at or below the inner surface of the tubular member (e.g., disposed in the recess in a manner that leaves the axial bore substantially unobstructed). Examples of tubular members that may be used with the invention comprise landing nipples, gas lift mandrels, packers, lengths of casing, external casing packers, slotted liners, slips, sleeves, perforating guns, multilateral junctions, and the like.

Figure 4:
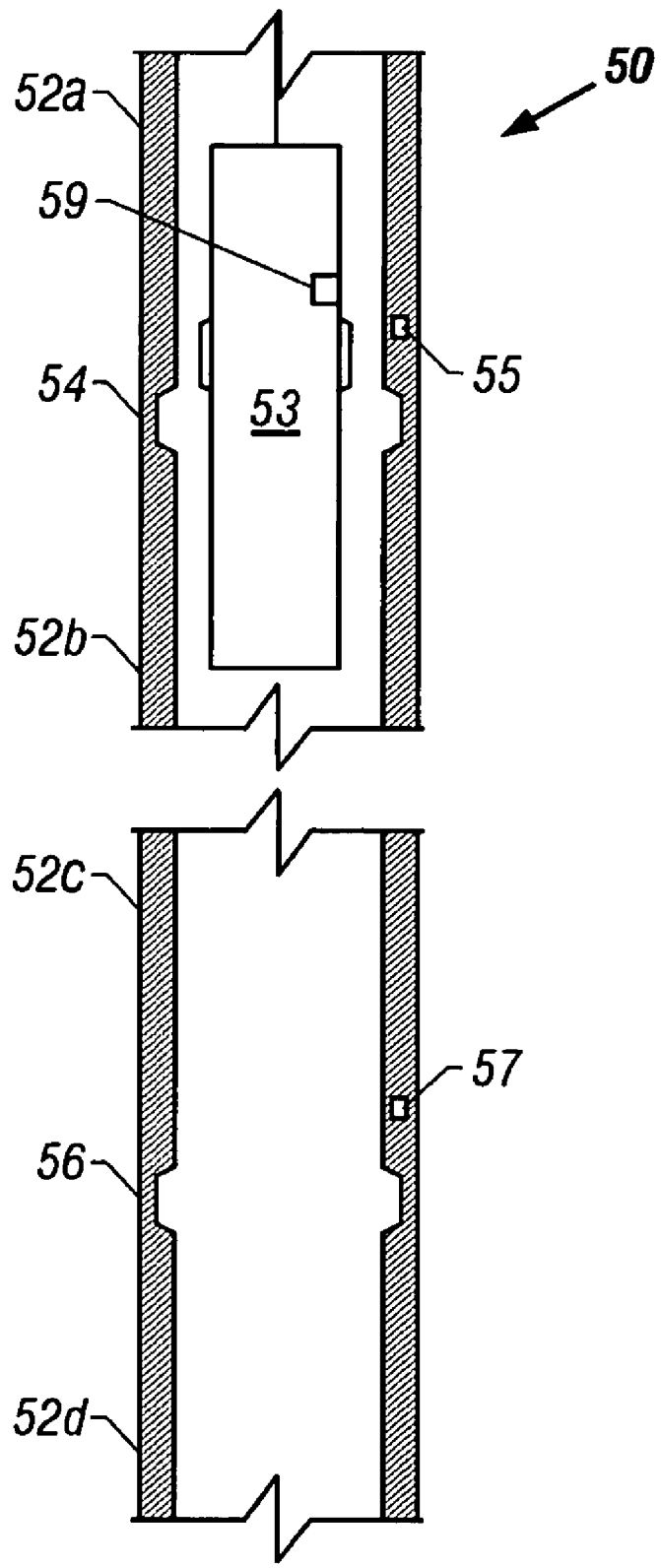
FIG. 4 shows a side cross-sectional view of an embodiment of the invention.

In another embodiment of the invention, two or more first transponders are secured at different depths in a wellbore. As shown in FIG. 4, a tubing string 50 may comprise joints 52a, 52b, 52c, and 52d of production tubing. Attached to the tubing joints 52a, 52b, 52c, 52d are a first landing nipple 54 and a second landing nipple 56, with first transponders 55, 57 attached thereto. When a second transponder 59 (e.g., a second transponder 59 coupled to a downhole tool 53) is lowered through the tubing string 50, it will detect and determine an identification code associated with the first transponders 55, 57.

The second transponder 59 may comprise, for example, a processor and a memory (and associated circuitry) (not shown separately in FIG. 4) adapted to detect and decode a signal transmitted by the first transponders 55, 57. The memory may be adapted to store a plurality of identification codes and operation instructions. If the second transponder 59 detects an identification code that corresponds to a reference code, it may operate the downhole tool 53 to which it is coupled according to an operation instruction stored in the memory. If, for example, the downhole tool 53 comprises a safety valve, the second transponder 59 may send an instruction that installs and/or operates the safety valve at a desired location in the wellbore (not shown). Further, if the second transponder 59 detects an identification code that does not match a reference code, the second transponder 59 may not operate the downhole tool 53 so that the downhole tool 53 may be axially displaced to a different depth in the wellbore (not shown) until the selected reference code is detected.

Figure 5:
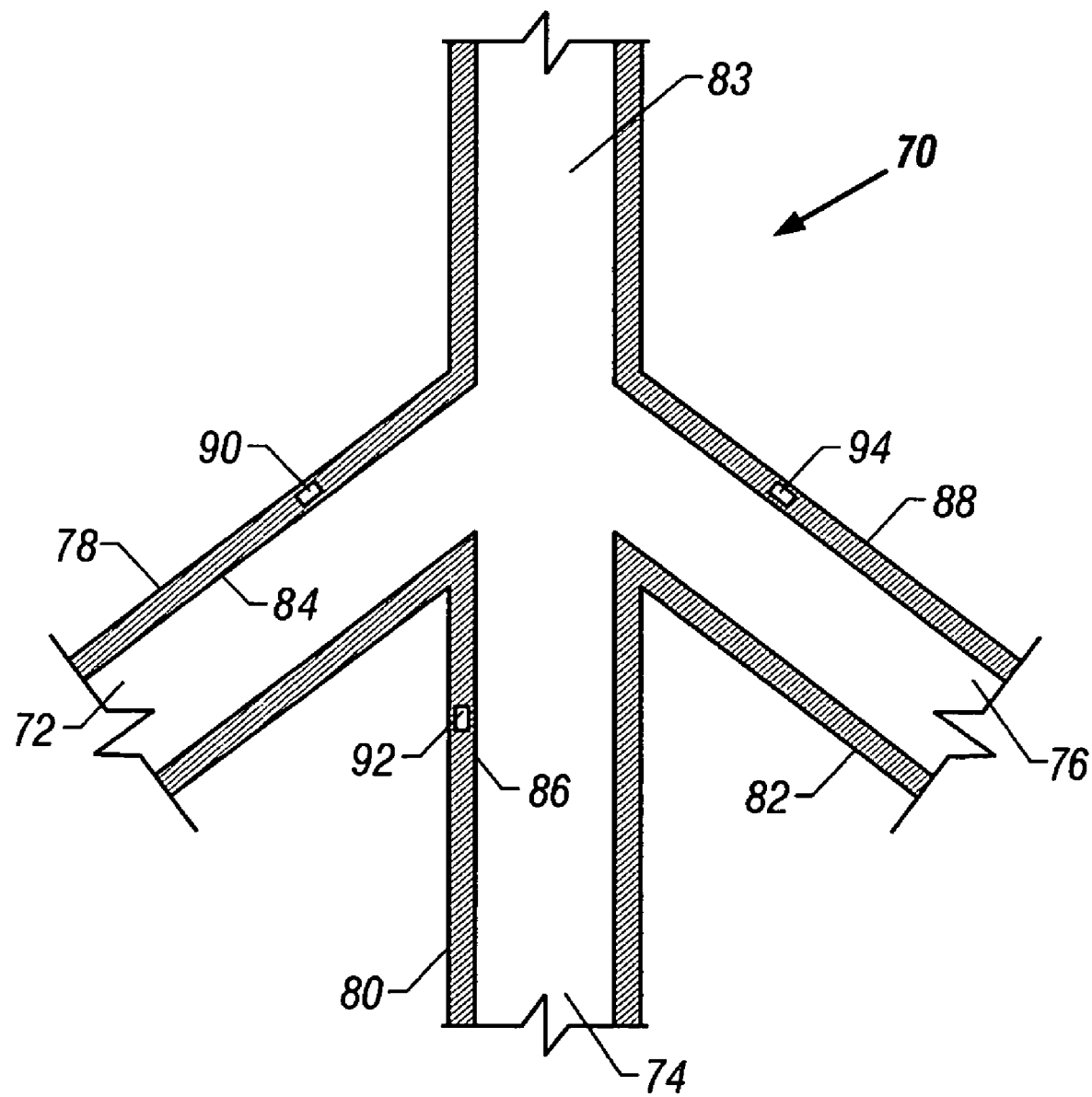
FIG. 5 shows a side cross-sectional view of a multilateral well including a plurality of lateral boreholes and an embodiment of the invention.

Another embodiment of the invention, shown in FIG. 5, may be used in a multilateral well 70 that comprises a plurality of lateral bores 72, 74, 76. Each of the lateral bores 72, 74, 76 may be defined, for example, by a lateral tubing string 78, 80, 82 branching off from a main wellbore 83. Each of the tubing strings 78, 80, 82 comprises at least one first downhole tool (e.g., landing nipples 84, 86, 88, each comprising a first transponder 90, 92, 94 disposed therein) disposed in a selected location in the lateral bores 72, 74, 76. When a second downhole tool (not shown) (e.g., such as a wireline retrievable subsurface safety valve) is lowered into the wellbore and proximate the lateral bores 72, 74, 76, a second transponder (not shown) disposed on the second downhole tool (not shown) may detect a signal reflected or transmitted by the first transponders 90, 92, 94 disposed in the lateral bores 72 74, 76 and will determine an identification code of each first downhole tool (e.g., the identification code associated with each of the landing nipples 84, 86, 88) so that, for example, the second downhole tool (not shown) may be oriented so that it can establish a connection with (e.g., form a latch connection with) or pass through one of the first downhole tools 84, 86, 88. By positioning the first transponders 90, 92, 94 with different identification codes in different lateral bores, specific lateral bores may be identified so that a connection with a selected lateral bore may be established. In other embodiments, identifying different lateral bores may be used to determine which lateral bore to drill through, perforate, produce through, and the like.

Another embodiment, shown in FIG. 13, comprises an electrical submersible pump 201 (ESP) integrated into a tubing string 204 in a Y-block configuration 200. At least one non-acoustic transponder 202 is located above the Y-block 200 so that, as a downhole tool (not shown) (e.g., a tool, pipe, coil, wireline, slickline, or other downhole tool) is lowered through the tubing string 204, a second transponder (not shown) disposed on the downhole tool (not shown) detects and determines an identification code of the transponder 202 disposed proximate the Y-block 200. After determining the identification code, a processor coupled to the second transponder (not shown) may send an instruction that may operate a steering mechanism coupled to the downhole tool (not shown) so that the downhole tool (not shown) can adjust course so as to avoid entry into a tubing branch containing the ESP 201. A second transponder 206 may be disposed below the Y-block 200 to serve as an indicator ensuring that the downhole tool (not shown) has entered the correct tubing branch.

As described above, suitable downhole tools may comprise, for example, subsurface safety valves, gas lift valves, packers, perforating guns, expandable tubing, expandable screens, flow control devices, and other downhole tools. Moreover, second transponders may be positioned proximate subsurface structures such as existing perforations, fractures, and shut-off zones, among other structures, so as to monitor a well condition during and after, for example, well stimulation (such as fracturing) or well intervention (such as perforating) operations.

Other embodiments of the invention comprise systems adapted to determine a depth at which a downhole tool is located. In these embodiments, for example, a tubing string may comprise at least two first downhole tools that are axially positioned at different depths in a wellbore. The first downhole tools may comprise landing nipples or similar downhole tools, or they may comprise tubing joints comprising non-acoustic transponders attached thereto or embedded therein.

Referring to FIG. 6A, a tubing string 120 disposed in a wellbore 122 comprises a plurality of joints of tubing 124, each connected to the next in an end-to-end fashion by, for example, threaded connections (not shown). At one end 126 of each joint 124 (or, for example, proximate the ends of a plurality of joints), a first non-acoustic transponder 100 (not shown separately in FIG. 6A) is disposed in a wall of the tubing.

FIG. 6B shows an example of a first transponder 100 disposed proximate a wall of a tubing joint 124. Because the length of each tubing joint 124 is known, and in view of the fact that the first transponders 100 (each first transponder 100 having, for example, a unique identification code) are positioned at known positions proximate the ends of each tubing joint 124, a relatively precise measurement of a depth of a downhole tool (not shown) (comprising, for example, second non-acoustic transponders 101 in a manner similar to the wireline lock 32 of FIG. 4) proximate the tubing joints 124 may be determined. In this and similar embodiments, identification codes of the transponders 100 disposed proximate the tubing joints 124 may be adapted to correspond to selected depths at which the tubing joints 124 are selected to be installed, and these identification codes may be detected by the second transponders 101 disposed proximate the downhole tool (not shown) as it is axially displaced in the wellbore 122 so as to determine the depth of the downhole tool in the wellbore 122. An application of this embodiment of the invention includes determining a depth of, for example, a perforating gun disposed in the wellbore 122 so as to activate the perforating gun at a selected depth to perforate tubing and/or casing.

In the embodiment shown in FIG. 14A, a perforating gun 210 comprising a first non-acoustic transponder 213 is lowered into a wellbore 211 with a supporting structure 212 until the perforating gun 210 is positioned at a selected depth proximate a second non-acoustic transponder 214 disposed in a downhole tool 216 (e.g., until the first transponder 213 disposed on the perforating tool 210 is positioned proximate the second transponder 214 disposed on the downhole tool 216). Alternatively, as shown in FIG. 14B, the perforating gun 210 may be "dropped" into the wellbore 211 without using a supporting structure so that the perforating gun 210 free-falls and fires automatically when the first transponder 213 disposed on the perforating tool 210 is proximate the second transponder 214.

As described above, the downhole tool may comprise a tool that is adapted to be raised or lowered in a wellbore. The downhole tool may be raised or lowered by attachment to, for example, a conveyance structure 40, such as a wireline, a slickline, coiled tubing, or drillpipe. As shown in FIGS. 7A and 7B, a second downhole tool 33 can be moved to different depths within the wellbore (not shown) relative to, for example, a first downhole tool 13, by activating the conveyance structure 40.

Figure 8:
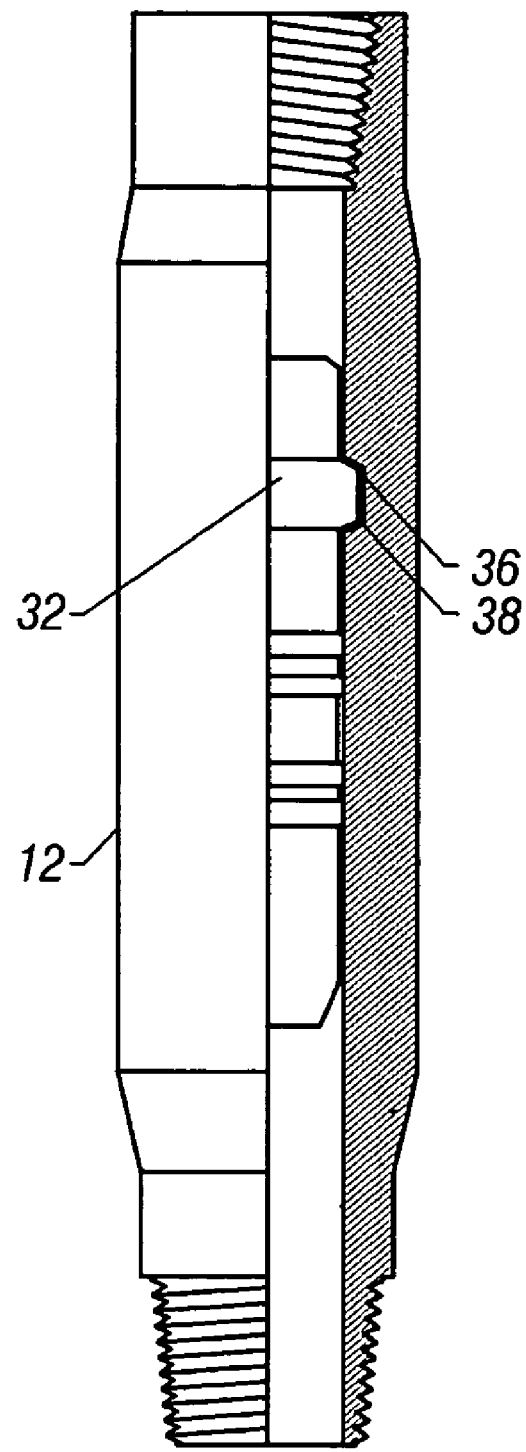
FIG. 8 shows a cross-sectional view of an embodiment of the invention.

In some embodiments of the invention, a downhole tool may be operated in response to a corresponding transmission and reception of a signal between non-acoustic transponders disposed on first and second downhole tools. For example, a first downhole tool comprising a first non-acoustic transponder may be axially displaced within a wellbore. A second downhole tool comprising a second non-acoustic transponder may be, for example, pre-positioned in the wellbore. The first non-acoustic transponder may receive a signal from the second non-acoustic transponder, and the signal may comprise a reference code that activates the first downhole tool. The signal may comprise, for example, instructions for the first downhole tool to deploy a locking apparatus into locking recesses formed in the second downhole tool. In other embodiments of the invention, the signal may comprise instructions that activate the second downhole tool or that activate both the first and second downhole tools substantially simultaneously or in a selected sequence. FIG. 8 shows one embodiment where locking tabs 36 disposed on a first downhole tool 32 can move outward into a locking engagement with locking recesses 38 formed on an inner surface of a second downhole tool 12 (e.g., a landing nipple) in response to a signal transmitted and received by transponders (not shown separately in FIG. 8) coupled to the first and second downhole tools 32, 12. Alternatively, the signal may comprise instructions to activate a perforating gun, open a downhole valve, and/or to perform similar operations known in the art.

In one embodiment of the invention, an identification code corresponds to an inner diameter of a tubular member, and a reference code is predetermined to match the identification code of a desired size of tubular member (e.g., a tubular member comprising a selected inner diameter) in which a first downhole tool is to be locked upon activation. Thus, when a transponder disposed on a second downhole tool determines that the identification code corresponds to the selected inner diameter, the first downhole tool may be activated so as to lockingly engage the tubular member. The first downhole tool may be adapted to engage a plurality of tubular members or different second downhole tools having, for example, different inner diameters and/or different locking features because of unique identification codes associated with the different downhole tools, different inner diameters, and the like.

An example of this embodiment of the invention is shown in FIGS. 9A and 9B. FIG. 9A shows a downhole tool 32 lockingly engaged with a landing nipple 12 by locking tabs 36 formed on the downhole tool 32 and adapted to engage locking recesses 38 formed on an inner diameter 35 of the landing nipple 12. As shown in FIG. 9B, when the downhole tool 32 is, for example, axially displaced within a wellbore (not shown) and is positioned proximate a second landing nipple 12a that has a larger inner diameter 37, the locking tabs 36 can be extended radially outwardly to a greater extent so as to engage locking recesses 38a formed on the landing nipple 12a and thereby secure the downhole tool 32 in the wellbore (not shown). The extent to which the locking tabs 36 should be extended may be determined by, for example, a signal (which may be, for example a unique identification code) transmitted by a first transponder 39a disposed on the landing nipple 12a and received by a second transponder 39b disposed on the downhole tool 32. Advantageously, a movable downhole tool may be used to engage a plurality of substantially stationary downhole tools with, for example, different internal diameters and the like, so that it is not necessary to maintain an inventory of many different sizes and/or configurations of movable downhole tools adapted to engage specific diameters.

Figure 10:
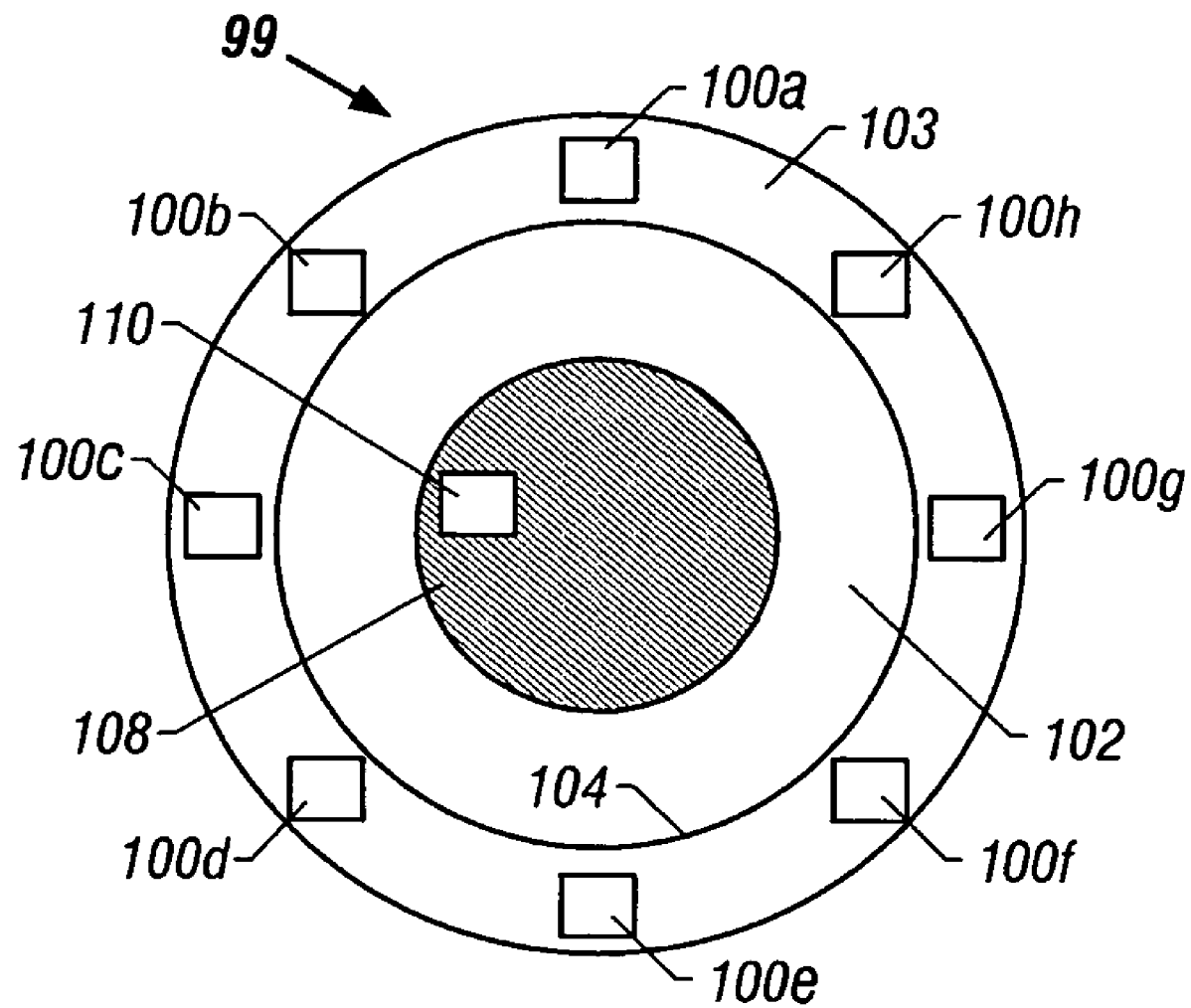
FIG. 10 shows a top cross-sectional view of an embodiment of the invention.

Another embodiment of the invention is shown in FIG. 10. A first downhole tool comprises a tubular member 99 having an axial bore 102 therethrough. The axial bore 102 is defined by an inner surface 103 of the tubular member 99, which has a generally circular inner diameter 104. The tubular member 99 comprises a plurality of first transponders 100a, 100b, 100c, 100d, 100e, 100f, 100g, and 100h azimuthally spaced about the inner diameter 104 and disposed proximate the inner surface 103, and in some embodiments (such as that shown in FIGS. 9A and 9B), the first transponders 100a, 100b, 100c, 100d, 100e, 100f, 100g, and 100h are disposed in a single cross-sectional plane. Each of the first transponders 100a, 100b, 100c, 100d, 100e, 100f, 100g, and 100h transmits a unique signal corresponding to a different identification code (and a different azimuthal position). When a second downhole tool 108, is lowered into the bore 102 of the tubular member 99, a second transponder 110 disposed proximate the second downhole tool 108 receives the identification code of the first transponder 100a, 100b, 100c, 100d, 100e, 100f, 100g, and 100h that is closest to it and thereby determines an azimuthal orientation of the second downhole tool 108 relative to the tubular member 99.

This embodiment is particularly useful for applications such as oriented perforating. For example, certain types of completion processes known in the art may be referred to as "dual-tubing completions" and the like. In these completion processes, more than one string of completion tubing is run into a drilled wellbore. The completion tubing strings may, for example, comprise different lengths, with one tubing string of a dual-tubing completion being longer than the other. In these applications, it is desirable to be able to orient a perforating gun so as to perforate one or the other of the tubing strings in a selected azimuthal direction. For example, when perforating a shorter of the two tubing strings of a dual-tubing completion arrangement, it is typically desirable to only perforate the short string so as to leave the longer string intact for later perforation thereof. Accordingly, by using azimuthally positioned transponders in the tubing strings or proximate thereto, a desired perforating orientation may be determined for perforating both the long and short tubing strings. Note that this type of oriented perforating may be used with single tubing strings and with a plurality of tubing strings within the scope of the invention.

Another embodiment of the invention may be used with, for example, subsurface safety valves, fluid or gas production control valves, or other downhole equipment that comprises sliding sleeves, valve closure members, or other movable structures. In this embodiment, as shown in FIGS. 11A and 11B, a first downhole tool comprises a movable sleeve 130 (or similar valve closure member) which has a first position and a second position (e.g., an open position and a closed position as shown in FIGS. 1A and 1B, respectively). Note that the movable sleeve 130 may be displaced from the open position to the closed position (and, e.g., back again) by any means known in the art including, but not limited to, mechanical means and hydraulic means. The movable sleeve 130 exposes a first transponder 105a and masks a second transponder 105b when the movable sleeve 130 is disposed in the first position (see FIG. 11A). The movable sleeve 130 masks the first transponder 105a and exposes the second transponder 105b when the movable sleeve 130 is disposed in the second position (see FIG. 11B). The first transponder 105a transmits a signal corresponding to an identification code that is different than a signal and code for the second transponder 105b. Thus, the detected identification code can be used to determine whether the movable sleeve 130 is in the open or closed (e.g., the first or second) position. Accordingly, this embodiment of the invention can provide a positive indication that activation (e.g., of a subsurface safety valve or production control valve) has occurred by determining if the valve is open or closed. Moreover, embodiments of the invention may be used to verify other information, such as whether a packer is securely disposed in a wellbore.

Figure 12:
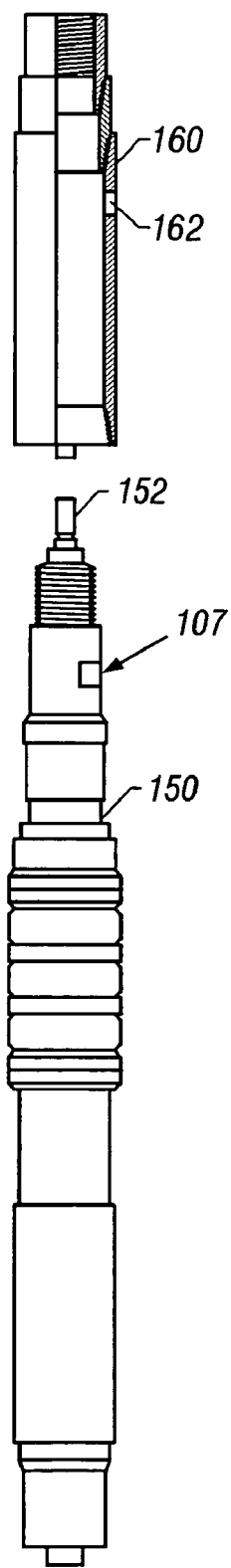
FIG. 12 shows a cross-sectional view of an embodiment of the invention.

Another embodiment of the invention may be used when "fishing" for tools or parts thereof that have become detached from a supporting structure in a wellbore. In this embodiment, as shown in FIG. 12, a first downhole tool 150 comprises a fishing neck 152 and a first transponder 107 disposed proximate the fishing neck 152. A fishing tool 160 comprises a second transponder 162 disposed thereon. An identification code corresponding to the first transponder 107 disposed proximate the fishing neck 152 may be analyzed (e.g., received) by the second transponder 162 disposed on the fishing tool 160 so as to determine when the fishing tool 160 is sufficiently close to the fishing neck 152 so that the fishing tool 160 may be activated to engage the fishing neck 152 and thereby retrieve the "fish" (e.g., the downhole tool 150) from the wellbore.

Figure 16:
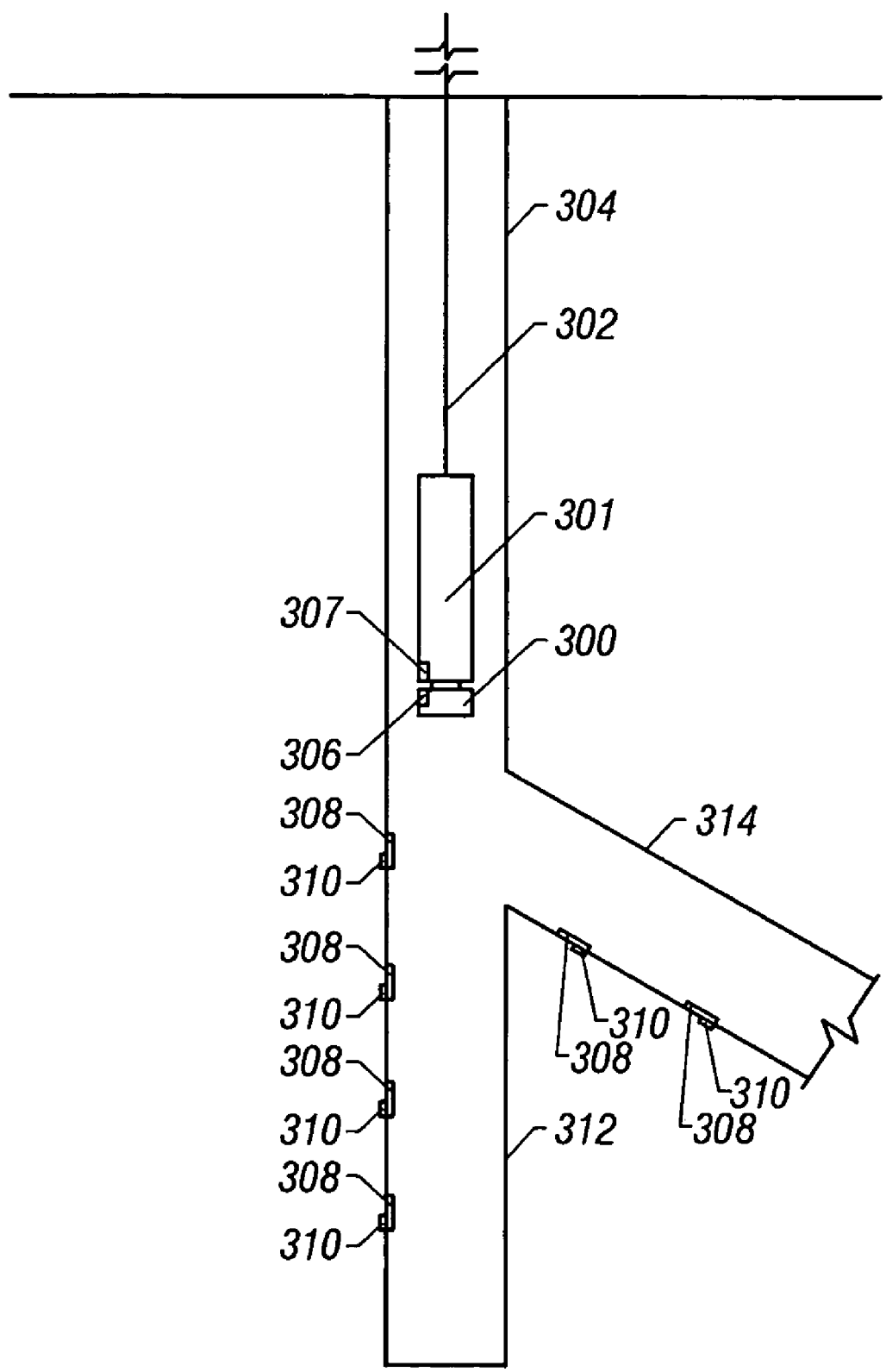
FIG. 16 shows a schematic view of an embodiment of the invention.

Another embodiment of the invention shown in FIG. 16 comprises a substantially autonomous downhole tool 300 that can be disengaged from a downhole tool 301 (e.g., coiled tubing, drill pipe, a wireline, a slickline, completion hardware, and the like) coupled to a conveyance structure 302 and released into a wellbore 304. The substantially autonomous downhole tool 300, which comprises a first non-acoustic transponder 306 coupled thereto, may then perform a desired operation in the wellbore 304 (e.g., at some distance horizontally and/or vertically from the point at which the substantially autonomous downhole tool 300 disengages from the downhole tool 301). For example, the substantially autonomous downhole tool 300 may disengage from the downhole tool 301 and move downhole in a main wellbore 312 or in a lateral wellbore 314. The first non-acoustic transponder 306 may be adapted to detect and record identification codes and/or record corresponding data signals communicated by a plurality of second non-acoustic transponders 308 (that may, for example, be coupled to at least one sensor 310) disposed in the main wellbore 312 and/or in the lateral wellbore 314. Note that, in these embodiments, the main wellbore 312 and the lateral wellbore 314 may be horizontal, vertical, or otherwise deviated from horizontal and/or vertical. Moreover, the lateral wellbore 314 may include a different diameter than the main wellbore 312. Movement of the substantially autonomous downhole tool 300 may be accomplished with means know in the art, such as conveyance mechanisms used for downhole "pigs" or "tractors" that are adapted for use in wellbores, pipelines, and the like.

The substantially autonomous downhole tool 300 may, after detecting and recording the identification codes and data signals from the second non-acoustic transponders 308, return to and reengage the downhole tool 301 so that the recorded identification codes and corresponding data signals may be communicated to the surface. In one embodiment, the recorded information may be transferred from the substantially autonomous downhole tool 300 to the downhole tool 301 (e.g., from the first non-acoustic transponder 306 to a third non-acoustic transponder 307 coupled to the downhole tool 301 when the first non-acoustic transponder 306 is positioned proximate thereto) and communicated to the surface. In other embodiments, the downhole tool 301 is raised so that the recorded data and identification codes may be retrieved at the surface.

In some embodiments, the third non-acoustic transponder 307 is coupled to the downhole tool 301 so that the first non-acoustic transponder 306 may communicate with and determine a proximity to the downhole tool 301 by communicating with the third non-acoustic transponder 307. For example, the substantially autonomous downhole tool 300 may reengage the downhole tool 301 after detecting an identification code communicated by the third non-acoustic transponder 307.

Moreover, the substantially autonomous downhole tool may comprise an actuator, an information relay device, or the like. In one embodiment, the substantially autonomous downhole tool comprises recorded instructions to be communicated downhole to, for example, a second non-acoustic transponder coupled to a downhole tool (such as a landing nipple) that comprises a target reference code. The substantially autonomous downhole tool may disengage from the conveyance structure and move into the main wellbore and/or the lateral wellbore so as to detect an identification code corresponding to the second non-acoustic transponder and to communicate the instructions from the first non-acoustic transponder to the second non-acoustic transponder (and, for example, engage the landing nipple) if the identification code matches the target reference code.

Another embodiment of the invention comprises a plurality of substantially autonomous downhole tools adapted to operate in, for example, different lateral wellbores, different diameter lateral wellbores, vertical sections of the wellbore, horizontal sections of the wellbore, different types of downhole fluids (e.g., a variety of different drilling fluids), and the like. The substantially autonomous downhole tools generally comprise first non-acoustic transponders adapted to detect identification codes and record data signals communicated by second non-acoustic transponders (that may, for example, be coupled to at least one sensor) disposed at various locations in the wellbore. Moreover, the first non-acoustic transponders may also be adapted to communicate information to the second non-acoustic transponders if the detected identification codes match a reference code.

Figure 17:
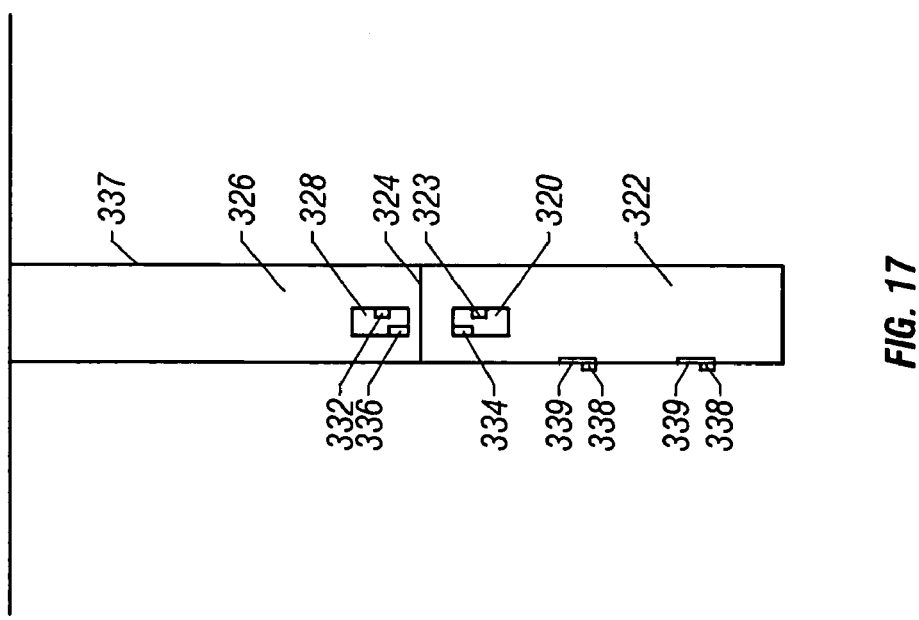
FIG. 17 shows a schematic view of an embodiment of the invention.

In one embodiment shown in FIG. 17, a first substantially autonomous downhole tool 320 may be adapted to operate in a first type of fluid 322 (e.g., in oil or another hydrocarbon) having a selected density. The density of the first fluid 322 may be determined by a first density sensor 323 operatively coupled to the first substantially autonomous downhole tool 320. The density measurement may be used, for example, to operate the first substantially autonomous downhole tool 320 in the first fluid 322 alone or at least proximate a boundary 324 between the first fluid 322 and a second fluid 326. Moreover, a density of a material used to form the first substantially autonomous downhole tool 320 may be selected to correspond to a density of the fluid in which it is designed to operate.

In this arrangement, the first substantially autonomous downhole tool 320 may easily move through the first fluid 322 with minimal propulsive force. In some embodiments, the substantially autonomous downhole tools may be formed from a carbon fiber material. Moreover, in some embodiments, propulsive force may be generated using a propeller or fan arrangement. However, other materials and propulsion mechanisms are known in the art and may be used with the invention, and examples described herein are not intended to be limiting.

A second substantially autonomous downhole tool 328 may be adapted to operate in the second type of fluid 326 (e.g., brine, fresh water, etc.) having a selected density. The density of the second fluid 326 may be determined by a second density sensor 332 operatively coupled to the second substantially autonomous downhole tool 328. The density measurement may be used, for example, to operate the second substantially autonomous downhole tool 328 in the second fluid 326 alone or at least proximate the boundary 324 between the fluids 322, 326. The second substantially autonomous downhole tool 328 may also be formed from a material having a density corresponding to a density of the fluid in which it is designed to operate.

The first and second substantially autonomous downhole tools 320, 328 are generally designed to operate in the first and second fluids 322, 326, respectively, and to communicate information to each other proximate the fluid boundary 324 therebetween. Note that, in some embodiments, the first and second substantially autonomous downhole tools may operate in the adjacent fluids (e.g., in the second and first fluids, respectively) in at least a limited manner, especially if the densities of the first and second fluids are relatively similar. If the densities are relatively dissimilar, operation in adjacent fluids is generally less efficient because, for example, more propulsive force may be required to move the second substantially autonomous downhole tool through the first fluid (which has a dissimilar density in comparison with the second substantially autonomous downhole tool). Note that the same may be true if operating the first substantially autonomous downhole tool in the second fluid.

In these embodiments, the first substantially autonomous downhole tool 320 typically comprises a first non-acoustic transponder 334 adapted to communicate identification codes and data signals to a second non-acoustic transponder 336 coupled to the second substantially autonomous downhole tool 328 (e.g., when the first and second substantially autonomous downhole tools 320, 328 are proximate each other near the fluid boundary 324). The second substantially autonomous downhole tool 328 may also communicate identification codes and/or data signals to the first substantially autonomous downhole tool in a similar manner. In other embodiments, for example, the second substantially autonomous downhole tool 328 may communicate programmed instructions to the first substantially autonomous downhole tool 320 that direct the first substantially autonomous downhole tool 320 to perform a selected function (such as for example, to retrieve data collected by sensors 338 coupled to a plurality of third non-acoustic transponders 339 disposed in a wellbore 337 and return the retrieved data so that the data may be recorded by the second substantially autonomous downhole tool 328 and communicated to the surface).

Figure 18:
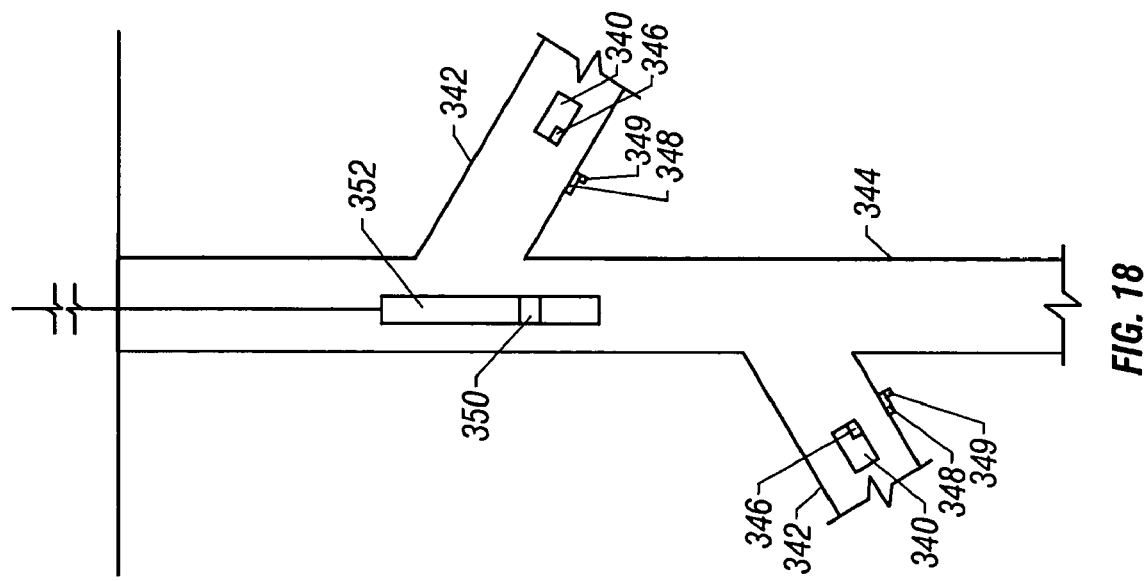
FIG. 18 shows a schematic view of an embodiment of the invention.

Other embodiments may be adapted to operate in different lateral wellbores. For example, in one embodiment shown in FIG. 18, a plurality of different substantially autonomous downhole tools 340 may be disposed in a plurality of different lateral wellbores 342 connected to a main wellbore 344. Each substantially autonomous downhole tool 340 may comprise a first non-acoustic transponder 346 coupled thereto and adapted to communicate identification codes and corresponding data signals with a plurality of second non-acoustic transponders 348 disposed in the lateral wellbores 342, and with a third non-acoustic transponder 350 disposed on a wireline tool 352 that is adapted to be movable in the main wellbore 344.

In some embodiments, when the third non-acoustic transponder 350 is positioned proximate each first non-acoustic transponder 346, instructions may be communicated so as to operate the substantially autonomous downhole tools 340 (e.g., each substantially autonomous downhole tool 340 may be instructed to travel into its corresponding lateral wellbore 342, detect identification codes and data signals from the plurality of second non-acoustic transponders 348 (that may be coupled to at least one sensor 349), and return to communicate the recorded information to the third non-acoustic transponder 350).

Accordingly, the third non-acoustic transponder 350 may collect and record data from and/or communicate information to the substantially autonomous downhole tools as it is moved through the wellbore. In this manner, data may be collected from a plurality of lateral wellbores in a single wireline trip. Note that, in other embodiments, substantially autonomous downhole tools positioned in selected horizontal and vertical sections of a wellbore may be communicated with and/or activated in a similar fashion.

In another embodiment, non-acoustic transponders may be used to send information from a downhole tool to a surface location. In this embodiment, sensors disposed on the downhole tool may monitor and record downhole data such as temperature, pressure, depth, tool position, tool orientation, and similar information (such as, for example, whether a sliding sleeve is an open or closed position). Further, the downhole tool can record data related to an installation or operational status of other downhole tools and equipment. The transponders may be dedicated to relaying a certain type of information or may be used to relay multiple data types. This type of data transfer enables, for example, a correlation of downhole data such as a downhole temperature and pressure at a selected time of when a perforating gun is activated.

Once the desired information is acquired by the downhole tool, a processor (e.g., a microprocessor) disposed in the downhole tool and coupled to the sensors and the transponders determines what information should be transmitted to the surface. The selected information is then written to a memory coupled to a releasable transponder. The releasable transponder is disposed in the tool and operatively coupled to the microprocessor. The releasable transponder may be disposed in the downhole tool in a variety of packaging configurations. For example, the releasable transponder can be installed in a spring-loaded device so that it may be locked in place against spring tension and "ejected" after the selected information has been written to the memory disposed thereon. In other embodiments, the releasable transponder may be disposed around a perimeter of a revolving chamber. The manner in which the releasable transponders are disposed in the downhole tool is not critical to the operation of the invention as long as a required number of releasable transponders are available for use and can be released so as to travel from the downhole tool to the surface.

The releasable transponders may be released to either an interior bore of the downhole tool or to an exterior of the downhole tool depending upon, for example, the type of downhole tool and the method of deployment of the downhole tool. In one embodiment, the releasable transponders are released to an annulus between the exterior of the downhole tool and the wellbore and are "pumped" to the surface by a circulating flow of drilling fluid. When the releasable transponders reach the surface, they may be retrieved from the flow of drilling fluid and the selected information written thereon may be downloaded by a data acquisition device so that the information stored on the releasable transponders may be saved to, for example, a memory disposed in a computer. A microprocessor disposed on the downhole tool may then repeat the information retrieval and recording and may release additional releasable transponders to the surface according to preprogrammed instructions.

The following example is illustrative of both tool-to-surface and surface-to-tool telemetry using non-acoustic transponders according to various aspects of the present invention to perform coiled tubing perforating operations. It should be noted that the example is equally applicable to other coiled tubing applications and to downhole applications using other conveyance systems (e.g., slickline systems, wireline systems, drillstrings, and the like).

Figure 15:
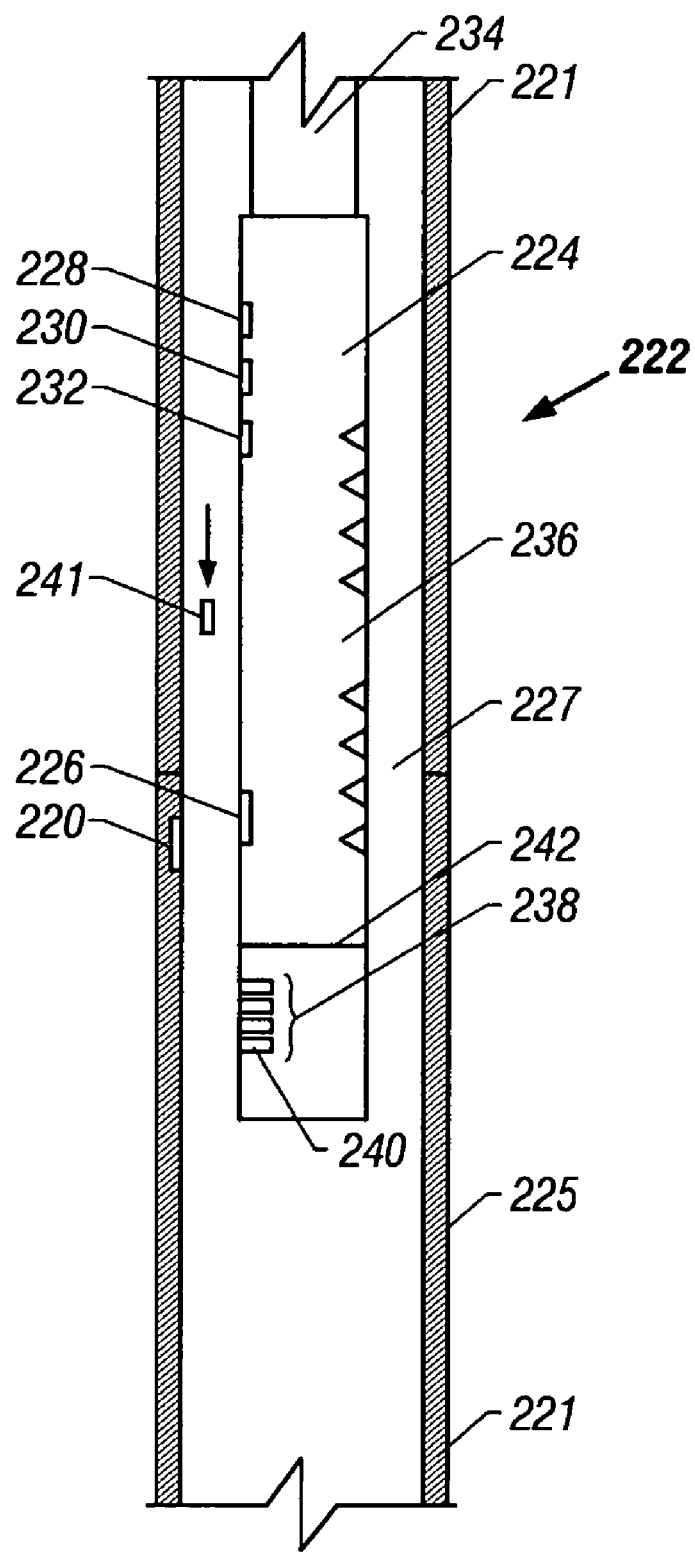
FIG. 15 shows a schematic view of an embodiment of the invention.

FIG. 15 shows a plurality of first non-acoustic transponders 220 located in collars 221 along a production string 222. A downhole tool 224 comprising a second non-acoustic transponder 226, a temperature gauge 228, a pressure gauge 230, and a tool clock 232 is attached to coiled tubing 234, and the downhole tool 224 conveys a perforating gun 236 downhole. The downhole tool 224 also comprises a spring-loaded column 238 of third non-acoustic transponders 240. A separate antenna 242 is used to write information to the third non-acoustic transponders 240.

As the downhole tool 224 is lowered into a wellbore 225 via the coiled tubing 234, drilling fluid is pumped into an annulus 227 between the production string 222 and the coiled tubing 234, through an axial bore of the downhole tool 224, and up an inner diameter of the coiled tubing 234. When the downhole tool 224 passes a collar 221 comprising a first transponder 220, an identification code of the first transponder 220 in the collar 221 is received by the second transponder 226 and is decoded by a microprocessor (not shown separately in FIG. 15) coupled to the second transponder 226. An antenna 242 coupled to the second transponder 226 then writes the identification code to a third transponder 240 positioned in the spring-loaded column 238. Moreover, instantaneous measurements of temperature, pressure, and the like, as well as the current time, are also written to the same third transponder 240 (note that the "current time" at the downhole tool 224 is generally is synchronized with a surface clock).

After the information is written to the third transponder 240, the third transponder 240 is released into the annulus 227. After release, another third transponder 240 is moved into position in the spring-loaded column 238. The third transponder 240 comprises a material density that, in some embodiments, is approximately equal to the fluid density of the drilling fluid so the released third transponder 240 travels up the inner diameter of the coiled tubing 234 with the flow of drilling fluid. When the third transponder 240 reaches the surface, information written from the second transponder 226 to the third transponder 240 is retrieved by a surface operator (not shown). The process may be repeated for each collar 221 comprising first transponders 220, thereby enabling measurements such as pressure versus well depth, temperature versus well depth, and the like.

After downhole information is received and analyzed by an operator at the surface, instructions may be programmed into a fourth transponder 241 at the surface. The programmed instructions may comprise information related to where (e.g., relative to a particular collar 221 at a selected depth in the wellbore) and when to fire the perforating gun 236. The fourth transponder 241 can be circulated to the downhole tool 224 via the flow of drilling fluid (e.g., pumped into the well through the annulus). When the fourth transponder 241 is proximate the second transponder 226 in the wellbore, the fourth transponder 241 can transmit the programmed instructions so that they are received by the second transponder 226 and decoded by the microprocessor (not shown) coupled thereto. The programmed instructions may be used to fire the perforating gun 236 and, after perforation, critical information, such as temperature and pressure in the wellbore proximate the perforation, can again be transmitted to the surface by third transponders 240 released from the downhole tool 224 in the manner described above.

Figure 19:
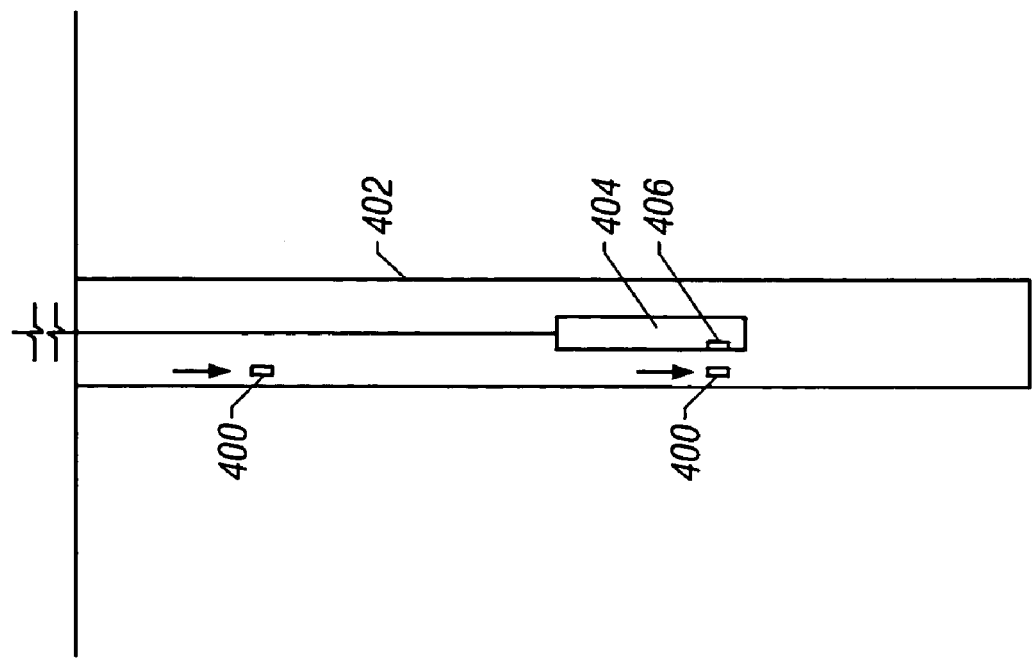
FIG. 19 shows a schematic view of an embodiment of the invention.

As shown in FIG. 19, non-acoustic transponders may also be used to transmit information from an operator at the surface to a downhole tool disposed in a wellbore 402. In this embodiment, instructions are programmed in a first non-acoustic transponder 400 proximate the surface. The first non-acoustic transponder 400 is then deployed in the wellbore by, for example, circulating or "pumping" the first non-acoustic transponder 400 downhole in a flow of drilling fluid. When the first non-acoustic transponder 400 is positioned proximate a second non-acoustic transponder 406 disposed on a downhole tool 404 positioned in the wellbore 402, the first non-acoustic transponder 400 may communicate the programmed instructions to the second non-acoustic transponder 406 so that a processor (not shown separately) coupled to the second non-acoustic transponder 406 may decode the programmed instructions. The processor (not shown separately) may then operate the downhole tool 404 so as to perform selected functions in accordance with the programmed instructions. A wide variety of instructions can be relayed from the surface and performed by the downhole tool including, for example, instructions to incrementally open a downhole valve, to adjust a tool trajectory so that the downhole tool may enter a lateral bore, and the like.

Figure 20:
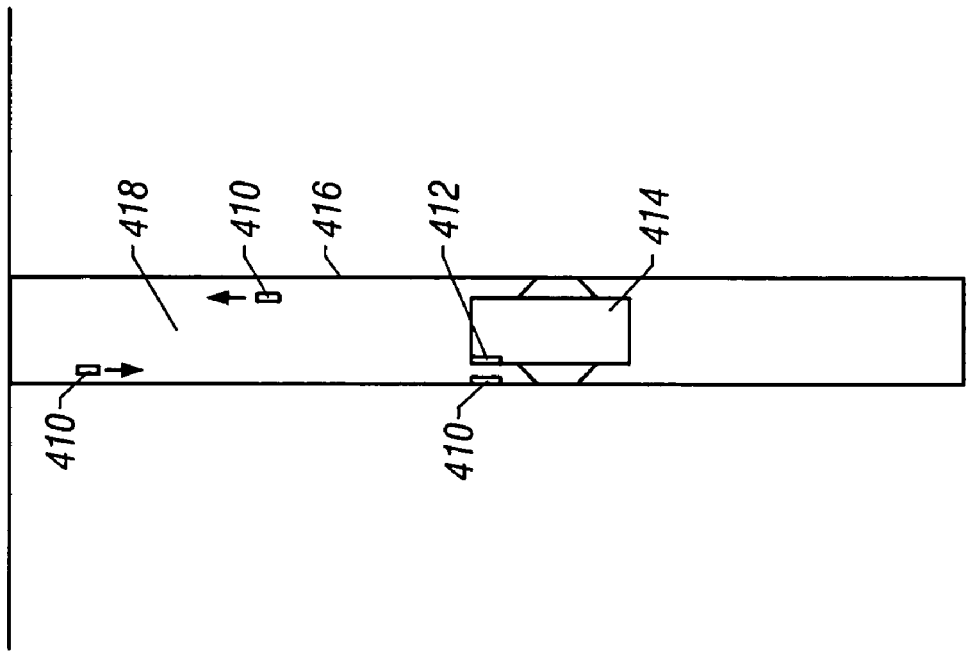
FIG. 20 shows a schematic view of an embodiment of the invention.

In another embodiment shown in FIG. 20, non-acoustic transponders may be pumped into a well without the use of, for example, a downhole tool. In these embodiments, drilling fluid can be used to convey the non-acoustic transponders downhole and back to the surface during normal drilling fluid circulation. For example, instructions and/or other data may be programmed into a first non-acoustic transponder 410 by an operator at the surface. The first non-acoustic transponder 410 may then be pumped into a wellbore 418 with a flow of drilling fluid. When the first non-acoustic transponder 410 is positioned proximate a second non-acoustic transponder 412 disposed in the wellbore 416 (e.g. the second non-acoustic transponder 412 may be disposed on a downhole tool 414, affixed to an inner surface of the wellbore or a length of casing, and the like), the first non-acoustic transponder 410 may transmit the programmed instructions to the second non-acoustic transponder 412. The instructions may be interpreted by a processor (not shown) coupled to the second non-acoustic transponder 412 so as to, for example, operate the downhole tool 414. The first non-acoustic transponder 410 may then be returned to the surface in the flow of drilling fluid.

In another embodiment shown in FIG. 21, second non-acoustic transponders 415 may communicate information that is recorded by the first non-acoustic transponder 410 and returned to the surface. For example, the second non-acoustic transponders 415 may be operatively coupled to downhole sensors 420 at selected depths in the wellbore 416 and may communicate identification codes and corresponding data signals to the first non-acoustic transponder 410 when the first non-acoustic transponder 410 is positioned proximate the second non-acoustic transponders 415. The first non-acoustic transponder 410 may be "pumped" to the surface and retrieved from the flow of drilling fluid by a surface operator so that the information recorded by the first non-acoustic transponder 410 may be analyzed to determine, for example, downhole conditions. In other embodiments, the first non-acoustic transponder 410 may be coupled to, for example, a drop ball or similar device.

In another embodiment shown in FIG. 22, first non-acoustic transponders 430 may be disposed at selected locations (e.g., at selected depths) along a wall of a wellbore 438 and may communicate identification codes and corresponding data signals related to formation information, well parameters, and/or completion characteristics at those locations to the surface via a downhole tool 436 comprising a second non-acoustic transponder 434 coupled thereto. When, for example, the well is logged using the downhole tool 436, the second non-acoustic transponder 434 may detect identification codes and corresponding data signals from the first non-acoustic transponders 430 disposed at substantially stationary positions proximate selected formations 440, 442, 444 and the like in the wellbore 438. The first non-acoustic transponders 430 may be coupled to at least one sensor 432, and the data signals may comprise detailed information related to a condition of the wellbore 438 and/or the formations 440, 442, 444. The data signals received by the second non-acoustic transponder 434 may be transmitted to the surface for use in further drilling, completion, and production operations.

Advantages of the embodiments of the invention may be enhanced by, for example, a central organization that supplies non-acoustic transponders (comprising, for example, distinct serial numbers) for use with downhole tools. The central organization could also maintain a database of identification codes/serial numbers associated with non-acoustic transponders attached to downhole tools. The database of serial numbers could be organized so as to allow identification of a type, rating, etc. of downhole equipment. Non-acoustic transponders may be adapted to store and transmit a signal corresponding to a serial number, type, rating, etc. of a downhole tool to which the non-acoustic transponder is attached, thereby permitting downhole identification of the tool.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for operating a downhole tool, the method comprising:

moving an instrument through a wellbore, the instrument comprising a first non-acoustic transponder coupled thereto, the first non-acoustic transponder adapted to detect identification codes;

comparing an identification code detected from at least one second non-acoustic transponder by the first non-acoustic transponder to a reference code, the at least one second non-acoustic transponder attached to an emplaced structure in the wellbore, the comparing performed when the instrument moves proximate to the at least one second non-acoustic transponder;

determining an azimuthal orientation of the downhole tool based on the identification code; and operating the downhole tool if the identification code matches the reference code.

2. The method of claim 1, wherein the first non-acoustic transponder comprises at least one of an optical transponder, a magnetic transponder, and an electrical transponder.

3. The method of claim 1, wherein the at least one second non-acoustic transponder comprises at least one of an optical transponder, a magnetic transponder, and an electrical transponder.

4. The method of claim 1, wherein the operating comprises firing a perforating gun.

5. The method of claim 1, wherein the operating comprises securing the downhole tool at a fixed position in the wellbore.

6. The method of claim 1, further comprising operating the emplaced structure if the identification code matches the reference code.

7. The method of claim 6, wherein the operating comprises firing a perforating gun.

8. The method of claim 6, wherein the operating comprises securing the downhole tool at a fixed position in the wellbore.

9. The method of claim 1, further comprising determining a depth of the downhole tool in the wellbore.

10. The method of claim 1, wherein the instrument is disposed on the downhole tool.

11. The method of claim 1, further comprising: moving the first non-acoustic transponder past a plurality of axially spaced apart second non-acoustic transponders each coupled to at least one sensor and adapted to communicate an identification code and data signal corresponding thereto; and detecting and recording the data signals and the identification codes communicated by each of the plurality of second non-acoustic transponders when the first non-acoustic transponder moves proximate each thereof, the recording performed to enable identification of a source one of the plurality of second non-acoustic transponders from which each data signal originated.

12. A method for operating a downhole tool, the method comprising:

moving an instrument through a wellbore, the instrument comprising a first non-acoustic transponder coupled thereto, the first non-acoustic transponder adapted to detect identification codes;

comparing an identification code detected from at least one second non-acoustic transponder by the first non-acoustic transponder to a reference code, the at least one second non-acoustic transponder attached to an emplaced structure in the wellbore, the comparing performed when the instrument moves proximate to the at least one second non-acoustic transponder;

operating the downhole tool if the identification code matches the reference code;

displacing a movable member coupled to the emplaced structure between a first and second position so as to expose one of the at least one second non-acoustic transponders and a third non-acoustic transponder, the displacing covering the other of the second and third non-acoustic transponders;

detecting an identification code communicated by the exposed one of the second non-acoustic transponder and the third non-acoustic transponder to the first non-acoustic transponder; and determining from the detected identification code if the movable member is in the first or second position.

13. A method for operating a downhole tool, the method comprising:

moving an instrument through a wellbore, the instrument comprising a first non-acoustic transponder coupled thereto, the first non-acoustic transponder adapted to detect identification codes;

comparing an identification code detected from at least one second non-acoustic transponder by the first non-acoustic transponder to a reference code, the at least one second non-acoustic transponder attached to an emplaced structure in the wellbore, the comparing performed when the instrument moves proximate to the at least one second non-acoustic transponder;

operating the downhole tool if the identification code matches the reference code;

displacing a movable member coupled to the instrument between a first and second position so as to expose one of the first non-acoustic transponder and a third non-acoustic transponder, the displacing covering the other of the first and third non-acoustic transponders;

detecting an identification code communicated by the exposed one of the first non-acoustic transponder and the third non-acoustic transponder to the at least one second non-acoustic transponder; and determining from the detected identification code if the movable member is in the first or second position.

14. A method of operating a perforating gun in a wellbore, the method comprising:

moving a perforating gun through a wellbore, the perforating gun comprising a first non-acoustic transponder coupled thereto, the first non-acoustic transponder adapted to detect an identification code;

comparing an identification code detected from at least one second non-acoustic transponder by the first transponder to a reference code, the at least one second non-acoustic transponder attached to an emplaced structure in the wellbore, the comparing performed when the first non-acoustic transponder is proximate the at least one second non-acoustic transponder; and firing the perforating gun if the identification code matches the reference codes, wherein the identification code corresponds to an azimuthal orientation of the at least one second non-acoustic transponder in the wellbore.

15. The method of claim 14, wherein the identification code corresponds to a depth of the at least one second non-acoustic transponder in the wellbore.

16. The method of claim 14, wherein the moving comprises allowing the perforating gun to free fall in the wellbore.

17. A downhole tool operation system comprising:

at least one first non-acoustic transponder emplaced in a wellbore and adapted to communicate an identification code;

at least one second non-acoustic transponder adapted to move through the wellbore, the at least one second non-acoustic transponder adapted to detect an identification code when proximate the at least one first non-acoustic transponder; and a processor operatively coupled to the at least one second non-acoustic transponder and adapted to compare the identification code to a reference code and operate the downhole tool if the identification code matches the reference code, wherein the identification code corresponds to an azimuthal orientation of the at least one first non-acoustic transponder in the wellbore.

18. The system of claim 17, wherein the at least one first non-acoustic transponder comprises at least one of an optical transponder, a magnetic transponder, and an electrical transponder.

19. The system of claim 17, wherein the at least one second non-acoustic transponder comprises at least one of an optical transponder, a magnetic transponder, and an electrical transponder.

20. The system of claim 17, wherein the at least one first non-acoustic transponder is secured proximate an axial bore of a tubular member emplaced in the wellbore.

21. The system of claim 20, wherein the at least one first non-acoustic transponder is embedded in the tubular member.

22. The system of claim 17, wherein the at least one first non-acoustic transponder is coupled to at least one of a landing nipple, a gas lift mandrel, a flow control valve mandrel, a length of tubing, a packer, a length of casing, an external casing packer, a slotted liner, a multilateral junction, a slip, and a sleeve.

23. The system of claim 17, wherein the downhole tool comprises at least one of a subsurface safety valve, a gas lift valve, a packer, a perforating gun, a length of expandable tubing, an expandable screen, and a flow control device.

24. The system of claim 17, further comprising a plurality of first non-acoustic transponders disposed at selected positions in the wellbore, each first non-acoustic transponder comprising a different identification code.

25. The system of claim 24, wherein selected ones of the plurality of first non-acoustic transponders are disposed in selected lateral bores of a multilateral well.

26. The system of claim 17, wherein the identification code corresponds to a depth of the at least one first non-acoustic transponder in the wellbore.

27. The system of claim 17, wherein a plurality of first non-acoustic transponders are disposed about a circumference of the wellbore and each of the first non-acoustic transponders comprises a different identification code, the processor adapted to determine a rotary orientation of the downhole tool from the identification codes.

28. The system of claim 17, wherein the downhole tool comprises a member movable between a first position and a second position and two second non-acoustic transponders disposed proximate the movable member, wherein one of the second non-acoustic transponders is exposed and the other of the second non-acoustic transponders is masked when the movable member is in the first position, and wherein the one of the second non-acoustic transponders is masked and the other of the second non-acoustic transponders is exposed when the movable member is in the second position, the masked one of the non-acoustic transponders prevented from communicating its identification code to the first non-acoustic transponder.

29. The system of claim 17, wherein the first non-acoustic transponder is disposed proximate an emplaced structure in the wellbore, the emplaced structure comprising a member movable between a first position and a second position, wherein the first non-acoustic transponder is exposed and a third non-acoustic transponder is masked when the movable member is in the first position, and wherein the first non-acoustic transponder is masked and the third non-acoustic transponder is exposed when the movable member is in the second position, the masked one of the non-acoustic transponders prevented from communicating its identification code to the at least one second non-acoustic transponder.

30. The system of claim 28, wherein the processor is adapted to determine a position of the movable member from the detected identification code.

31. The system of claim 29, wherein the processor is adapted to determine a position of the movable member from the detected identification code.

32. The system of claim 17, further comprising a locking mechanism adapted to secure the downhole tool in a selected position in the wellbore when the downhole tool is operated.

33. The system of claim 32, wherein the locking mechanism comprises at least one radially expandable lock disposed proximate an outer surface of the downhole tool and adapted to lockingly engage at least one locking surface formed on an inner surface of the wellbore.

* * * * *